US008997138B2

(12) United States Patent
Shkedi

(10) Patent No.: US 8,997,138 B2
(45) Date of Patent: Mar. 31, 2015

(54) CORRELATING ONLINE BEHAVIOR WITH PRESUMED VIEWING OF TELEVISION ADVERTISEMENTS

(75) Inventor: Roy Shkedi, New York, NY (US)

(73) Assignee: Intent IQ, LLC, New York, NY (US)

(*) Notice: Subject to any disclaimer, the term of this patent is extended or adjusted under 35 U.S.C. 154(b) by 103 days.

(21) Appl. No.: 12/906,007

(22) Filed: Oct. 15, 2010

(65) Prior Publication Data

US 2012/0096491 A1 Apr. 19, 2012

(51) Int. Cl.
| | | |
|---|---|---|
| *H04N 7/10* | (2006.01) | |
| *H04N 7/025* | (2006.01) | |
| *H04N 21/61* | (2011.01) | |
| *H04N 21/45* | (2011.01) | |
| *H04N 21/462* | (2011.01) | |
| *H04N 21/81* | (2011.01) | |
| *H04N 21/2668* | (2011.01) | |
| *H04N 21/433* | (2011.01) | |

(52) U.S. Cl.
CPC ........ *H04N 21/6175* (2013.01); *H04N 21/4532* (2013.01); *H04N 21/4622* (2013.01); *H04N 21/812* (2013.01); *H04N 21/2668* (2013.01); *H04N 21/4331* (2013.01)
USPC .................................. 725/32; 725/34; 725/35

(58) Field of Classification Search
CPC .......... H04N 21/2668; H04N 21/4331; H04N 21/4532; H04N 21/4622; H04N 21/812
See application file for complete search history.

(56) References Cited

U.S. PATENT DOCUMENTS

| | | |
|---|---|---|
| 5,105,184 A | 4/1992 | Pirani et al. |
| 5,809,242 A | 9/1998 | Shaw et al. |
| 5,848,396 A | 12/1998 | Gerace |
| 5,855,008 A | 12/1998 | Goldhaber et al. |
| 5,933,811 A | 8/1999 | Angles et al. |
| 5,948,061 A | 9/1999 | Merriman et al. |

(Continued)

FOREIGN PATENT DOCUMENTS

| | | |
|---|---|---|
| JP | 2006-004441 | 1/2006 |
| KR | 10-0793513 | 1/2008 |

(Continued)

OTHER PUBLICATIONS

Kim et al., "Target Advertisement Service Using TV Viewers' Profile Inference", PCM 2005.*

(Continued)

*Primary Examiner* — Nathan Flynn
*Assistant Examiner* — James R Marandi
(74) *Attorney, Agent, or Firm* — Louis J. Hoffman; David S. Alavi

(57) ABSTRACT

A method implemented using a programmed hardware computer system comprises: in response to a request to deliver an advertisement received from a TVP or STB (or another entity for the STB), causing a television advertisement to be directed to the STB; storing indicia derived from that direction; and taking an action with respect to an online user interface device (such as a computer, game machine, or mobile phone) associated with the STB, which action is either (i) causing delivery to the online user interface device of an online advertisement targeted based on the presumed viewing of the television advertisement, or (ii) identifying a correlation between the presumed viewing of the television advertisement and subsequent online behavior conducted using the online user interface device that is or has been tracked.

33 Claims, 3 Drawing Sheets

(56) References Cited

U.S. PATENT DOCUMENTS

| | | |
|---|---|---|
| 5,978,013 A | 11/1999 | Jones et al. |
| 6,026,368 A | 2/2000 | Brown et al. |
| 6,055,573 A | 4/2000 | Gardenswartz et al. |
| 6,073,241 A | 6/2000 | Rosenberg et al. |
| 6,157,946 A | 12/2000 | Itakura et al. |
| 6,160,989 A | 12/2000 | Hendricks et al. |
| 6,189,008 B1 | 2/2001 | Easty et al. |
| 6,216,129 B1 | 4/2001 | Eldering |
| 6,327,574 B1 | 12/2001 | Kramer et al. |
| 6,366,298 B1 | 4/2002 | Haitsuka et al. |
| 6,377,986 B1 | 4/2002 | Philyaw |
| 6,385,592 B1 | 5/2002 | Angles et al. |
| 6,446,261 B1 | 9/2002 | Rosser |
| 6,463,533 B1 | 10/2002 | Calamera et al. |
| 6,463,585 B1 | 10/2002 | Hendricks et al. |
| 6,487,538 B1 | 11/2002 | Gupta et al. |
| 6,490,587 B2 | 12/2002 | Easty et al. |
| 6,536,041 B1 | 3/2003 | Knudson et al. |
| 6,684,194 B1 | 1/2004 | Eldering et al. |
| 6,718,551 B1 | 4/2004 | Swix et al. |
| 6,771,290 B1 | 8/2004 | Hoyle |
| 6,832,207 B1 | 12/2004 | Shkedi |
| 6,845,396 B1 | 1/2005 | Kanojia |
| 6,847,992 B1 | 1/2005 | Haitsuka et al. |
| 6,868,392 B1 | 3/2005 | Ogasawara |
| 6,925,440 B1 | 8/2005 | Shkedi |
| 6,973,436 B1 | 12/2005 | Shkedi |
| 7,013,290 B2 | 3/2006 | Ananian |
| 7,051,351 B2 | 5/2006 | Goldman et al. |
| 7,072,853 B2 | 7/2006 | Shkedi |
| 7,092,926 B2 | 8/2006 | Cerrato |
| 7,100,183 B2 | 8/2006 | Kunkel et al. |
| 7,152,237 B2 | 12/2006 | Flickinger et al. |
| 7,158,943 B2 | 1/2007 | Van der Riet |
| 7,188,085 B2 | 3/2007 | Pelletier |
| 7,260,823 B2 | 8/2007 | Schlack et al. |
| 7,428,493 B2 | 9/2008 | Shkedi |
| 7,454,364 B2 | 11/2008 | Shkedi |
| 7,747,745 B2 | 6/2010 | Shkedi |
| 7,756,744 B2 | 7/2010 | Schiff et al. |
| 7,822,637 B2 | 10/2010 | Shkedi |
| 7,822,639 B2 | 10/2010 | Shkedi |
| 7,856,372 B2 | 12/2010 | Ullah |
| 7,856,373 B2 | 12/2010 | Ullah |
| 7,861,260 B2 | 12/2010 | Shkedi |
| 7,890,609 B2 | 2/2011 | Shkedi |
| 7,900,229 B2 | 3/2011 | Dureau |
| 7,937,383 B2 | 5/2011 | Hintze et al. |
| 7,966,647 B1 | 6/2011 | Igoe et al. |
| 7,971,260 B2 | 6/2011 | Spalink et al. |
| 7,979,307 B2 | 7/2011 | Shkedi |
| 7,984,466 B2 | 7/2011 | Eldering et al. |
| 8,015,286 B2 | 9/2011 | Jenkins |
| 8,024,765 B2 | 9/2011 | Ramanathan et al. |
| 8,051,444 B2 | 11/2011 | Shkedi |
| 8,086,491 B1 | 12/2011 | Matz et al. |
| 8,250,600 B2 | 8/2012 | Kodialam et al. |
| 8,522,271 B2 | 8/2013 | Childress et al. |
| 2002/0013943 A1 | 1/2002 | Haberman et al. |
| 2002/0019769 A1 | 2/2002 | Barrits et al. |
| 2002/0032603 A1 | 3/2002 | Yeiser |
| 2002/0056088 A1 | 5/2002 | Silva et al. |
| 2002/0059602 A1 | 5/2002 | Macrae et al. |
| 2002/0078444 A1 | 6/2002 | Krewin et al. |
| 2002/0082910 A1 | 6/2002 | Kontogouris |
| 2002/0104086 A1 | 8/2002 | Tomsen et al. |
| 2002/0120933 A1 | 8/2002 | Knudson et al. |
| 2002/0120935 A1 | 8/2002 | Huber et al. |
| 2002/0123928 A1 | 9/2002 | Eldering |
| 2002/0124249 A1 | 9/2002 | Shintani et al. |
| 2002/0124253 A1 | 9/2002 | Eyer et al. |
| 2002/0129362 A1 | 9/2002 | Chang et al. |
| 2002/0129368 A1 | 9/2002 | Schlack et al. |
| 2002/0166119 A1 | 11/2002 | Cristofalo |
| 2002/0194058 A1 | 12/2002 | Eldering |
| 2002/0194604 A1 | 12/2002 | Sanchez et al. |
| 2003/0018969 A1 | 1/2003 | Humpleman et al. |
| 2003/0051242 A1 | 3/2003 | Donnelly |
| 2003/0066078 A1 | 4/2003 | Bjorgan et al. |
| 2003/0093792 A1 | 5/2003 | Labeeb et al. |
| 2003/0126597 A1 | 7/2003 | Darby et al. |
| 2003/0131355 A1 | 7/2003 | Berenson et al. |
| 2003/0135853 A1 | 7/2003 | Goldman et al. |
| 2003/0145323 A1 | 7/2003 | Hendricks et al. |
| 2003/0149975 A1 | 8/2003 | Eldering et al. |
| 2003/0187949 A1 | 10/2003 | Bhatt et al. |
| 2003/0208756 A1 | 11/2003 | Macrae et al. |
| 2003/0208758 A1 | 11/2003 | Schein et al. |
| 2003/0226141 A1 | 12/2003 | Krasnow et al. |
| 2003/0229900 A1 | 12/2003 | Reisman |
| 2004/0003406 A1 | 1/2004 | Billmaier |
| 2004/0010546 A1 | 1/2004 | Klug et al. |
| 2004/0031058 A1 | 2/2004 | Reisman |
| 2004/0073915 A1 | 4/2004 | Dureau |
| 2004/0078809 A1 | 4/2004 | Drazin |
| 2004/0107437 A1 | 6/2004 | Reichardt et al. |
| 2004/0117827 A1 | 6/2004 | Karaoguz et al. |
| 2004/0123314 A1 | 6/2004 | Bova |
| 2004/0163101 A1 | 8/2004 | Swix et al. |
| 2004/0172650 A1 | 9/2004 | Hawkins et al. |
| 2005/0076393 A1 | 4/2005 | Sussman |
| 2005/0086112 A1 | 4/2005 | Shkedi |
| 2005/0125289 A1 | 6/2005 | Beyda et al. |
| 2005/0125290 A1 | 6/2005 | Beyda et al. |
| 2005/0165638 A1 | 7/2005 | Piller |
| 2005/0165643 A1 | 7/2005 | Wilson et al. |
| 2005/0165644 A1 | 7/2005 | Beyda et al. |
| 2005/0177420 A1 | 8/2005 | Tanahashi |
| 2005/0229215 A1 | 10/2005 | Schein |
| 2005/0246736 A1 | 11/2005 | Beyda et al. |
| 2006/0090184 A1 | 4/2006 | Zito et al. |
| 2006/0116924 A1 | 6/2006 | Angles et al. |
| 2006/0212350 A1 | 9/2006 | Ellis et al. |
| 2006/0253323 A1 | 11/2006 | Phan et al. |
| 2006/0259357 A1 | 11/2006 | Chiu |
| 2006/0271953 A1 | 11/2006 | Jacoby et al. |
| 2007/0027850 A1 | 2/2007 | Chan et al. |
| 2007/0027901 A1 | 2/2007 | Chan et al. |
| 2007/0033269 A1 | 2/2007 | Atkinson et al. |
| 2007/0038516 A1 | 2/2007 | Apple et al. |
| 2007/0073585 A1 | 3/2007 | Apple et al. |
| 2007/0089127 A1 | 4/2007 | Flickinger et al. |
| 2007/0100690 A1 | 5/2007 | Hopkins |
| 2007/0143786 A1 | 6/2007 | Deitsch et al. |
| 2007/0157228 A1 | 7/2007 | Bayer et al. |
| 2007/0198532 A1 | 8/2007 | Krikorian et al. |
| 2007/0208619 A1 | 9/2007 | Branam et al. |
| 2007/0214048 A1 | 9/2007 | Chan et al. |
| 2007/0220553 A1 | 9/2007 | Branam |
| 2007/0266403 A1 | 11/2007 | Ou et al. |
| 2007/0277220 A1 | 11/2007 | Shikuma et al. |
| 2007/0294401 A1 | 12/2007 | Shkedi |
| 2007/0294721 A1 | 12/2007 | Haeuser et al. |
| 2008/0016540 A1 | 1/2008 | Savoor et al. |
| 2008/0040742 A1 | 2/2008 | Howcroft et al. |
| 2008/0109376 A1 | 5/2008 | Walsh et al. |
| 2008/0109843 A1 | 5/2008 | Ullah |
| 2008/0181225 A1 | 7/2008 | Zampiello |
| 2008/0189360 A1 | 8/2008 | Kiley et al. |
| 2008/0222283 A1 | 9/2008 | Ertugrul et al. |
| 2008/0243822 A1 | 10/2008 | Campbell et al. |
| 2008/0244076 A1 | 10/2008 | Shah et al. |
| 2008/0275785 A1 | 11/2008 | Altberg et al. |
| 2008/0281699 A1 | 11/2008 | Whitehead |
| 2009/0037949 A1 | 2/2009 | Birch |
| 2009/0049468 A1 | 2/2009 | Shkedi |
| 2009/0049469 A1 | 2/2009 | Small et al. |
| 2009/0055862 A1 | 2/2009 | Knoller et al. |
| 2009/0106100 A1 | 4/2009 | Mashinsky |
| 2009/0171780 A1 | 7/2009 | Aldrey et al. |
| 2009/0172723 A1 | 7/2009 | Shkedi |
| 2009/0172728 A1* | 7/2009 | Shkedi et al. ............ 725/34 |
| 2009/0204706 A1 | 8/2009 | Ertugrul et al. |
| 2009/0217319 A1 | 8/2009 | Weiss |

(56) References Cited

U.S. PATENT DOCUMENTS

| | | | |
|---|---|---|---|
| 2010/0058383 | A1 | 3/2010 | Chang et al. |
| 2010/0076848 | A1 | 3/2010 | Stefanik et al. |
| 2011/0035256 | A1 | 2/2011 | Shkedi |
| 2011/0167043 | A1 | 7/2011 | Hintze et al. |
| 2011/0258049 | A1 | 10/2011 | Ramer et al. |
| 2012/0023522 | A1 | 1/2012 | Anderson |
| 2012/0066385 | A1 | 3/2012 | Jenkins |
| 2013/0104159 | A1 | 4/2013 | John |

FOREIGN PATENT DOCUMENTS

| | | |
|---|---|---|
| KR | 10-2009-0113456 | 8/2012 |
| WO | WO 02/19720 | 3/2002 |
| WO | WO2005/046237 | 5/2005 |

OTHER PUBLICATIONS

Wingfield, Nick; "New TiVo Feature Lets Families Share Videos on TV Via the Web"; The Wall Street Journal Online; Nov. 14, 2006.
"Visible World Targets Advertising Industry"; from http://informitv.com; Feb. 20, 2005.
"Venture Market Summary"; VentureWire Alert; Mar. 29, 2005.
Todd, Daniel; "The New World of Desktop Advertising"; DMNews.com; Mar. 28, 2007.
TiVo and Brightcove Partner to Deliver Broadband Content to TiVo Subscribers; press release from www.tivo.com; May 10, 2006.
"TiVo to Insert Ads at End of Probrams"; The Wall Street Journal Online; Nov. 28, 2006.
"TiVo Launches Television's New Advertising Search Product"; press release from www.tivo.com; May 8, 2006.
"TiVo Debuts New Lexus Car Configuration Application"; press release from www.tivo.com; May 11, 2006.
"TiVo Begins Rollout of Online Services Now Accessible Directly on the TV"; press release from www.tivo.com; Dec. 1, 2005.
"TiVo Announces First Advertising Search Product for Television"; press release from www.tivo.com; Nov. 28, 2005.
"TiVo Launches New Interactive Advertising Technology"; press release from www.tivo.com; Jul. 18, 2005.
"This Ad's for You—Just You"; BusinessWeek online; Jun. 28, 2005.
Tam, Pui-Wing; "TiVo, Amazon to Deliver Web Video to TV Sets"; The Wall Street Journal Online; Feb. 7, 2007.
Story, Louise; "The Web drives an advertising boom without the need for agencies"; International Herald Tribune (iht.com); Feb. 8, 2007.
Shukla, Anuradha; "Visible World Offers 'Any Screen' Solution for Customized Video Advertising"; from www.tmcnet.com; Feb. 6, 2007.
Saunders, Christopher; "NetZero to Launch Mobile Ad Platform"; from website www.clickz.com; Mar. 29, 2001.
Olsen, S.; "TiVo is in talks with Internet search giants Google and Yahoo over possibledeal . . . television and the Web . . . "; www.news.com; Apr. 18, 2005.
"Nissan, BellSouth, Music Blvd. Among Latest Advertisers to Sign Up With NetZero"; press release from www.irconnect.com; Nov. 16, 1998.
Newcomb, Kevin; "BMW Uses TiVo Technology to Improve Product Placement"; from www.clickz.com; Jun. 21, 2006.
"NetZero and Juno's sophisticated targeting capabilities enable advertisers to hit an exact audience of qualified consumers"; from www.untd.com; 2007.
"NetZero Launches Ad-Backed Access Service"; from website www.clickz.com; Oct. 20, 1998.
"NetZero Guarantees Increase in Web Site Traffic for New Adverstisers"; press release from www.irconnect.com; circa 2000.
"Medio Systems to Launch Mobile Performance Ad Network—Search and recommendation technologies propel advancements in mobile advertising", article from Mobilestreams website, Mar. 19, 2007.
Luening, E.; "Free ISP NetZero beefs up ad services"; web page at http://www.news.com/Free-ISP-NetZero-beefs-up-ad-services/2100-1023_3-241067.html; Jan. 2, 2002.
"LookSmart and NetZero Extend and Enhance Winning Partnership"; press release found on www.shareholder.com; Feb. 9, 2000.
Keegan, Paul; "The Man Who Can Save Advertising"; from http://money.cnn.com; Nov. 1, 2004.
Kaye, Kate; "TiVo Broadens CBS Offerings, Adds Web-to-TV Services"; from www.clickz.com; Nov. 15, 2006.
Hunt, T.J., "Moving Target", Financial Post, Oct. 1, 2000.
Grant, Peter; "To Ward Off New Competitors, Comcast Builds a Mini Internet"; Wall Street Journal online; Oct. 13, 2005.
Grant, Peter and Marr, Merissa; "Comcast Nears Pact With Disney to Offer ABC Shows on Demand"; The Wall Street Journal Online; Nov. 21, 2006.
"Google moves into TV ads with BSkyB Deal"; Guardian Unlimited; Dec. 7, 2006.
FAQ from Zango Ad Services; http://adservices.zango.com; 2007.
Engage Technologies, Inc.; Form S-1A; filed with the SEC; pp. 36-50; Jul. 19, 1999.
"Comcast, Time Warner Cable hopeful on network DVRs"; from www.reuters.com; Mar. 30, 2006.
"Comcast, Cox Buy Interactive TV Company"; from Yahoo.com Financial News; Jul. 13, 2005.
Chen, Andy; "Behavioral Matchmaking, Part 3: GPS and Behavioral Targeting"; from website http://www.clickz.com; Nov. 24, 2004.
Chen, Andy; "The New Behavioral Wunder"; from webpage http://www.clickz.com; Apr. 11, 2007.
"Cable's Big Bet on Hyper-Targeting. Time Warner will test new software that sends different ads to different viewers."; BusinessWire online; Jul. 4, 2005.
"BSkyB in Google Link-up"; Financial Times (FT.com); Dec. 6, 2006.
Bergstein, B.; "Ad-targeted System Monitors Your Interests with ISP's Help"; from website www.siliconvalley.com; Dec. 10, 2007.
Battelle, John; "The Search—How Google and Its Rivals Rewrote the Rules of Business and Transformed Our Culture"; pp. 167-171; 2005.
"180Solutoins Launched All-In-One Online Ad Solution—Metricsdirect Outperforms Conventional Cost-Per-Click Models"; from www.zango.com; Mar. 30, 2004.
White, B.; "Watching What You See on the Web"; Wall Street Journal Online; Dec. 6, 2007.
"What's New: The Latest on Technology Deals"; from Dow Jones VentureWire; as published on Wall Street Journal Online; Oct. 22, 2007.
"DoubleClick Launches New Marketing Solutions"; from website www.clickz.com; Oct. 6, 1998.
International Search Report and Written Opinion of the International Searching Authority; PCT/US2011/056468; May 29, 2012.

\* cited by examiner

CORRELATING ONLINE BEHAVIOR WITH PRESUMED VIEWING OF TELEVISION ADVERTISEMENTS

BACKGROUND

The field of the present invention relates to online access and targeted delivery or presentation of advertisements. In particular, online behavior is correlated with, or online advertisements are targeted based on, previous display of a television advertisement on a STB, with a television viewer having been presumed to have viewed the television advertisement.

Systems or methods disclosed here may be related to material disclosed in:

U.S. non-provisional application Ser. No. 11/736,544 filed Apr. 17, 2007 (Pub. No. US 2008/0259906 A1);
U.S. non-provisional application Ser. No. 11/968,117 filed Dec. 31, 2007 (Pub. No. US 2009/0172728 A1);
U.S. non-provisional application Ser. No. 12/131,798 filed Jun. 2, 2008 (Pub. No. US 2009/0300675 A1);
U.S. non-provisional application Ser. No. 12/131,824 filed Jun. 2, 2008 (Pub. No. US 2009/0299843 A1);
U.S. non-provisional application Ser. No. 12/257,386 filed Oct. 23, 2008 (Pub. No. US 2009/0049468 A1); and
U.S. non-provisional application Ser. No. 12/860,666 filed Aug. 20, 2010 (not yet published).

Each listed application and publication is incorporated by reference. Although the listed applications use similar terminology, there are some differences between terminology used in those applications and that used in the present disclosure or claims. The definitions or descriptions set forth in the present disclosure shall apply herein.

Some of the terms used in the present disclosure or appended claims are defined as follows.

Television provider (TVP)—an entity that provides television service to a subscriber or user via any suitable transmission medium, including but not limited to coaxial cable, fiber-optical cable, network cable, phone line, satellite transmission, cellular transmission, 3G transmission, 4G transmission, WiMax transmission, WiFi transmission, other IEEE 802 transmission, or VHF or UHF transmission.

Internet service provider (ISP; equivalently, an online access provider)—an entity that provides online access to a subscriber or user via any suitable transmission medium, including but not limited to coaxial cable, fiber-optical cable, network cable, phone line, satellite transmission, wireless transmission (e.g., 3G, 4G, WiMax, WiFi, or other IEEE 802 wireless protocols), or VHF or UHF transmission. The online access enables the subscriber to access the Internet and its myriad online sites, or to access any future network successor to the Internet.

ISP/TVP—in some instances a single entity (or providers controlled by a single entity) can provide to one or more subscribers or users both television service and online access. Such an entity is referred to herein as an ISP/TVP. Although an ISP and a TVP may be represented schematically in the drawings by separate labeled boxes, the drawings are intended to encompass implementations in which the ISP and the TVP are independent entities as well as other implementations in which a common ISP/TVP provides both services.

Set-top box (STB)—a device that connects a television and a signal source. As is recognized by those of skill in the art, a "television" is any device known in the art or developed hereafter that is capable of presenting television content to a viewer or user, e.g., a CRT or flat panel television set, a home theater system, a computer monitor, a tablet computing device, or a mobile phone or other handheld device. Some examples of STBs include cable boxes (often combined with personal video recorders), online-coupled gaming machines, appropriately configured computer systems that can drive a computer monitor, or modules of a mobile phone system allowing content presentation. The STB receives an incoming signal, extracts content from the received signal, and transmits the extracted content to the television to be presented to a viewer.

The signal source can be one or more of a computer network cable (e.g., an Ethernet or other transmission-speed cable), a satellite dish, a coaxial cable connected to a cable television system, a telephone line or digital subscriber line (DSL), a wireless network connection (e.g., via a cellular telephone network, WiFi, or other wireless connection), an antenna (VHF, UHF, digital, or other), or another suitable signal source. The content can include, but is not limited to, video (which often can include an audio portion), audio, Internet web pages, interactive games, or other content. An STB may or may not include a dedicated television tuner.

Each STB typically is assigned an identifier of some sort by the corresponding TVP, e.g., to enable the TVP to direct specific signals or programming to a specific STB, to identify the source of requests, commands, queries, or responses received from a particular STB, or for other purposes. In some instances such an STB identifier might be known only to the corresponding TVP and not available for outside communication. If the STB is connected to the Internet as a signal source (directly, through another device, or through the corresponding TVP; connected to the Internet only, or also connected in parallel to another signal source such as a cable television transmission infrastructure), the STB identifier can include an STB IP address (i.e., an Internet Protocol address) or a tag such as a cookie. If the STB is connected to both the Internet and another signal source, the STB identifier can include an identifier specific to the other signal source in addition to an STB IP address, tag, or cookie. In some instances the STB identifier is static, while in other instances (particularly those involving an STB IP address) the STB identifier is dynamic and can change from time to time. In examples wherein the STB identifier includes an IP address, network traffic can in some instances be directed to the set-top box via its IP address without the sender being aware that the IP address corresponds to a set-top box.

Despite its name, an STB need not be physically located on top of a television set literally. Under current technology, STBs often are located physically adjacent to the television set, such as in a media cabinet or the like, but it is not even necessary that the STB be located in proximity to the television. Nor is it necessary that the STB be a box, literally. Rather, a STB might be implemented, for example, as a circuit board, integrated circuit, set of integrated circuits, or software that is physically integrated with another "box," such as the television, a cable or other connection, a computer, a mobile phone, or a building equipment or junction box, which also has other functions, or without being housed in any "box" at all.

Online user interface device—any user interface device used to access a remote network such as the Internet at least intermittently, including but not limited to a smart phone or mobile handset, a personal digital assistant (PDA), a game console, or a networked computer (desktop, workstation, notebook, laptop, or other).

Online access device—any device used to connect an online user interface device to a remote network such as the Internet, including but not limited to a modem, a wired or wireless router, a wireless access point, a wired network adapter (e.g., Ethernet adapter), a wireless network adapter (e.g., WiFi, other IEEE 802.11, WiMax, ED-VO, EDGE, HSPA, CDMA, GSM, or other), or an optical fiber based network adapter (e.g., a network interface unit or optical network terminal). Different types of online access devices can be and sometimes are combined into a single unit (e.g., a modem that also functions as a router for a LAN). An online user interface device and an online access device can be, and sometimes are, combined into a single unit (e.g., a computer with a built-in Ethernet adapter, wireless adapter, or modem, or a mobile phone that can be used for online access).

Each online access device typically is identified on the Internet by an Internet Protocol address (i.e., an IP address; currently, under IPv4, an IP address comprises a sequence of four numbers each ranging from 0 to 255, i.e., a 32-bit address; under IPv6, an IP address comprises a 128-bit address; other, future-developed IP address protocols shall fall within the scope of the present disclosure or appended claims). Every transmission of data over the Internet includes a destination IP address to enable the transmitted data to reach its intended destination. In some instances an online access device has a static IP address, while in other, more common instances an online access device has an IP address that is dynamic and changes from time to time. Although IP addresses are referred to herein for enabling data transmitted via the Internet to reach its intended destination, that terminology is intended to encompass any functionally equivalent online access device identifier employed to route such transmitted data to its intended destination through the Internet or through any future successor network.

Router—any device that acts as a junction between networks, to buffer and transfer data between or among them. For example, a router can be employed to connect a local area network (LAN) to the Internet, thereby enabling online user interface devices connected to the LAN to share a connection to the Internet through the router. The router receives data from devices on the LAN and transmits them to the Internet directed to their corresponding destinations, and receives data from the Internet and directs them to the corresponding devices on the LAN.

Modem—a device that enables online access by a user by acting as an interface between the online access provider's network transmission system and the user's computer or other online user interface device. Modems vary according to the type of provider network transmission system. Unless a specific type of modem is specified, the term "modem" shall encompass telephone modems, cable modems, DSL modems, wireless modems, satellite modems, or modems for providing online access to any other suitable network transmission system.

Dynamic Host Configuration Protocol (DHCP)—a system that automatically assigns Internet Protocol addresses (IP addresses), subnet masks, default routers, and other IP parameters, which are required for proper routing of data transmissions to or from a particular device connected to the network. The assignment usually occurs when a DHCP-configured computer, modem, router, or other device boots up or regains connectivity to the network. The DHCP client (i.e., DHCP software resident in the device) sends out a query requesting a response from a DHCP server on the network. The query is typically initiated immediately after booting up and before the client initiates any IP-based communication with other hosts. The DHCP server then replies to the client with its assigned IP address, subnet mask, domain name server (DNS), and default gateway information (referred to as "stateful" assignment). The assignment of the IP address usually expires after a predetermined period of time, at which point the DHCP client and server renegotiate a new IP address from the DHCP server's predefined pool of IP addresses. Because, under DHCP, the IP address of a given computer varies over time, various network-related functions are more difficult. For example, configuring firewall rules to allow access to or from a machine that receives its IP address via DHCP is more complicated because the IP address varies from time to time. Network administrators typically must enable access to an entire remote DHCP subnet for a particular TCP/UDP port. Such complications arise in other instances as well. Many residential routers and firewalls are configured in the factory to act as DHCP servers for home networks. A computer can also be used as a DHCP server. Internet Service Providers (ISPs) generally use DHCP to assign individual IP addresses to subscribers. DHCPv6, which is the Dynamic Host Configuration Protocol for Internet Protocol Version 6 (IPv6), enables local generation of IP addresses (i.e., "stateless" assignment). Although such stateless address auto-configuration of IPv6 substantially eliminates a prime motivation for DHCP in IPv4, DHCPv6 can still be used to statefully assign addresses if needed or desired by a network administrator. DHCPv6 can also be used to distribute information not otherwise discoverable, e.g., the domain name server.

User (equivalently, subscriber, viewer)—the term "user" shall be construed as what is thought to be an individual person receiving online access or television service at a delivery end-point, which is typically located within a household, office, business, or other site or establishment served by an online access provider or TVP. A single household, office, business, or other location often has multiple users. In some instances, a business having multiple physical locations may be served by separate online or television services, but in other instances, a business may have an internal LAN or WAN that extends service provided to multiple physical locations. Also, some online user interface devices and televisions are portable, and can access the service from remote locations. Accordingly, the term "user" does not require a fixed or single location in such instances. Reference to a "user" in some contexts actually refers to computer-controlled activity (monitoring, advertisement delivery, etc.) done in connection with a device (e.g., television, phone, laptop, or fixed-location computer) thought to be operated by the individual person called the "user." However, it is understood that a given device might be operated by multiple persons, such as different members of a household or business, at different times.

Behavioral targeting—the delivery of specific advertisements to a user, the advertisements being selected on the basis of activity of the user, typically recent activity, including but not limited to: online or television-based searches conducted by the user; content viewed or otherwise accessed by the user online or on television; online or television advertisements viewed, clicked on, interacted with, or otherwise accessed by the user; shopping or purchases made by the user online or through a television; and any other form of previous user online or television activity.

Central Ad Server (CAS)—a computer server that manages delivery of advertisements (television or online) to visitors of online sites or viewers of television programs. A local ad server can be typically run by a single publisher to serve ads to visitors of one or more websites or viewers of television programs of that publisher, or by a single advertiser to serve ads into ad space acquired by the advertiser on various websites or television programs. A third-party or remote ad server typically is remotely located and delivers advertisements of various advertisers to visitors of websites or viewers of programs of multiple publishers. The remote ad server acts as a central conduit for delivering advertisements, enabling advertisers and publishers to track the distribution of their online or television advertisements and to control the rotation and distribution of their advertisements across the Internet or television system from one location. Either a local or a remote ad server can be considered a CAS. The advertisements can be stored on the CAS for later delivery, can be transmitted to the CAS and then delivered from the CAS upon receiving an ad request, or can be delivered from another source in response to an ad request received and routed by the CAS. Examples of third-party ad servers include DoubleClick's DART for Publishers central ad server (also known as DFP) and DoubleClick's DART for Advertisers central ad server (also known as DFA). In some cases, a CAS can be owned or used by a TVP, an ISP, an STB provider or modem provider, an online content provider, a profile aggregator, a profile distributor, an ad broker, an ad network, an ad exchange, an ad agency, an online advertiser, a TV advertiser, a TV ad space owner, or a TV content provider, representatives or proxies of any of those entities, or other entities. In some instances that CAS will operate independently of an ISP or TVP.

Profile provider—An entity that has or collects profile information that is used to target advertisements. In the context here, the profile provider controls or cooperates with a CAS, which receives all or part of the profile information from the profile provider for use in targeting television or online advertisements. User profile information derived from online or television activity can include, for example, observed online behavior of a user accessing the Internet (e.g., online content viewed or accessed, online searches performed, online purchases made, or times and dates of such behavior), observed viewing or interaction behavior of a television viewer (e.g., television programs or ads viewed, responses to interactive programs or ads, or times and dates of such behavior), or demographic information collected from an Internet user or television viewer.

Examples of profile providers can include, but are not limited to, any entity that owns, controls, or uses: (1) a visited Internet site server; (2) a server delivering content, images, audio, video, text, or any combination directed to an online user interface device (such as a computer or other online interface device) via an online access device (such as a modem or router), either directly or indirectly (e.g., via a redirect); (3) a server delivering content, images, audio, video, text, or any combination directed to a television via a STB (indirectly via a TVP; or directly via an STB IP address, without necessarily being aware that the IP address in question corresponds to a STB); (4) a server delivering an ad to an online user interface device via an online access device on behalf of an advertiser or an ad network; (5) a server delivering a television ad to a television via a STB (indirectly via a TVP; or directly via an STB IP address, without necessarily being aware that the IP address in question corresponds to a STB) on behalf of an advertiser or an ad network; (6) a server recording an activity conducted from an online user interface device such as a click on an ad or a link to an ad, a viewing of an ad, a click on a link to particular content, a search, a request for product information, receipt of particular content, a product purchase, a telephone call made, or any other selected and definable user activity; or (7) a server facilitating instant messages or any other kind of communication on behalf of the user.

Another example of a profile provider is: (8) a company sponsoring and having access to a software program located on the user's computer or other online user interface device that can observe the user's online activity (with the user's permission), such as a browser toolbar or desktop search software. A profile provider, broadly, can be: (9) any entity able to collect behavioral profiles (e.g., observed online activity) or demographic profiles (provided by the user), typically including a device identifier (e.g., an online user interface device identifier) used when profile information was observed or collected and the date and time that profile information was observed or collected, regardless of whether or not the entity collected the profile information directly through contact with the user's computer or indirectly from another entity such as those listed in this definition. In some cases, a user's online activity will result in direct contact between the online user interface device (via an online access device) and the profile provider, e.g., if the profile provider is an online commerce site, the user makes a purchase at the site, and the online commerce site generates a profile for that user. In other instances there may be no direct contact between the profile provider and the user, e.g., if the user makes a purchase at an online commerce site that in turn reports information pertaining to the user to the profile provider. In some situations, also, a profile provider might also own or otherwise control a CAS, in which case user profiles can be immediately available to the CAS without need to transmit between entities.

Profiles or partial profiles provided by a profile provider to a CAS can contain any quantity of profile information, such as, in one example, just an online access IP address or STB IP address (not necessarily identified as such) used by a person at the time his profile was collected and the identity of the profile provider. The profile can include, e.g., a profile identifier or profile name, a username, or a login ID, or other online user interface device identifier; the profile can be referenced by or included in a cookie or tag placed on a user's online user interface device. The IP address can be provided by the profile provider itself or might be obtained by the CAS when a user engages in any online activity or provides an item of demographic information and is redirected by a profile provider to the CAS. In another example, a profile can be more extensive and can include demographic or online behavioral information, such as an extensive browsing history, shopping or purchase histories, content or programs viewed online, and other information concerning the user's characteristics or the user's activities. In some instances a profile includes PII (typically provided by the user); in other instances it does not. The profile need not be stored in a single location; profile information that collectively defines a single user profile can be stored in one or more databases on one or more servers, in tags or cookies placed on one or more user interfaces devices, or at a combination of those locations. Although the profile provider is an entity, many or most of the actions attributed to the profile provider are actually performed by equipment under the administrative control of the profile provider, such as computers, servers, software running on those computers or servers, network connection hardware or software, or other equipment. Such actions may still be characterized as being performed "by the profile provider," whether performed automatically, semi-automatically, or manually.

Personally Identifiable Information (PII)—information that can be used to identify a specific person, including but not limited to: name, Social Security number (SSN), date of birth, street address, email address, static IP address (if any), phone number (home, work, wireless), financial account numbers (bank accounts, credit accounts, or any other financial data), driver's license number, vehicle registration number, vehicle license number, facial photographs, fingerprints, handwriting or signature, or any other information that can assist in identifying a specific person.

Non-Personally-Identifiable Information (non-PII)—information about a person that typically cannot be used to specifically identify that person, including but not limited to: city, state, or country of residence, age, gender, race, ethnicity, school or workplace (if sufficiently large), salary or income, hobbies, dynamically assigned IP addresses, online sites visited, online searches conducted, or other information that is useful to know about a person but does not by itself allow one knowing the information to identify the particular person.

Cookie—a text file placed on a user's computer by any server that also serves content of any type to the user's computer using browser software. That content can include, for example, an entire web page, only a portion of a web page, one or more images, or even a single pixel; the user need not be aware of every server that delivers such content, and in many cases is not (e.g., if that server delivers only a single-pixel image). The cookie typically can be read or altered only by a server operating under the same Internet domain as the server that originally placed the cookie. The cookie file can be used to identify a computer that has already been in contact with the same domain (e.g., it can act as an online user interface device identifier) and can also be used to store PII or non-PII pertaining to a user of that computer. In a first example, a cookie can store non-PII such as previous searches conducted at the site, or pages viewed or visited at the site, by the computer user. In a second example, a cookie can be used to store a username used by the user to access a site, customized preferences of the user, or various pieces of PII. It should be noted that a cookie file can also be created, altered, or deleted by software located on the user's computer.

Television advertisement (TV ad)—a full screen video ad, a partial screen video ad, a banner ad, a text ad, an audio ad, or any other form of ad suitable for delivery to and visual or audible presentation by a television (as defined above) or other device for delivering television content. TV ads can be spatially juxtaposed with or overlaid on the television program (e.g., banner ads) or can be temporally interleaved with the television program (e.g., traditional 15-, 30-, or 60-second spot ads).

Various systems and methods are used currently for targeting ads based on user, viewer, or customer behavior. Some of those may rely on the collection of PII to enable correlation of the person exhibiting the behavior and advertisements targeted at that person; in others, advertisements can be targeted without collecting PII. In those latter examples it is often the case that the medium of the behavior and that of the advertisement are the same. For example, many grocery stores hand out so-called "club cards" that need not be linked to PII. A shopper presents the card at checkout to receive various discounts, thereby allowing the store to link the list of purchased items to the card. As the system "learns" the shopper's purchasing habits, the system begins issuing coupons targeted at purchases that the shopper has made previously or that the system predicts the shopper may wish to make based on past purchases.

In another example, online advertisements are readily targeted based on an Internet user's online activities without using PII. The use of cookies enables an ad server to recognize an Internet site visitor who has been previously presented with ads by the ad server or who has conducted searches or accessed content at sites linked to the ad server; the cookies need not include PII to enable that functionality. The ad server can target future advertising to the site visitor based on that previous activity. A user who has searched for airline tickets to southern California on an online travel site, for instance, can later receive targeted online advertisements for Disneyland, delivered perhaps while visiting some other online site, to the user's computer from an ad server that collected the user's search information from the online travel site.

Regardless of whether PII is used or not, targeting advertising in one medium based on activity in another, or advertising on one device type based on activity on another, can be problematic. Various schemes currently are implemented, under development, or being considered wherein PII is used, e.g., to target television advertisements based on a viewer's online behavior. Some of those schemes involve agreements or alliances among TVPs, online access providers, online search portals, or online sites. The PII has typically been required to make the connection between the different media, because different devices are typically employed to access each one.

To satisfy various laws, regulations, or policies pertaining to user privacy in an online environment, a primary goal is to maintain segregation of a user's PII (which may or may not be used to establish as association between devices of differing media) from that user's online behavioral profile information (e.g., sites visited, content viewed, searches requested, or products purchased). It has also been deemed desirable, from a privacy perspective, to maintain similar segregation between (i) a user's online profile information and (ii) information or data on specific television viewing habits or profiles linked to a specific STB, even though that viewing data may not constitute PII.

Several proposed schemes (e.g., as disclosed in one or more of the applications listed above) would enable targeting of television ads based on observed online behavior while maintaining that segregation of PII, or without using PII at all. Whether or not PII is used, and regardless of the manner of its use, the prevalent use of dynamic device addresses, e.g., for enabling online access, creates significant technological impediments to cross-media targeting of ads.

Due to privacy reasons, it is desired to avoid reporting which TV programs or channels have been viewed using a specific STB. On the other hand, it is desired to generate (or store) STB-originated reports of which selected or default TV ads were delivered within which TV programs or on which TV channels, so as to report to the advertiser the exact number of ads delivered to the target audience through STBs and the amount owed by the advertiser as a consequence, and to report to TV ad space sellers the amount of inventory used in delivering ads and the amount they are owed as a consequence. These apparently inconsistent goals create technical obstacles to cross-media flexible advertising systems.

Recording or tracking user behavior in one medium in response to observed behavior in another, and correlating those behaviors, are also desirable goals. Such capability can enable an advertiser to target future ads more accurately, to evaluate the effectiveness of particular ads or ad campaigns, or for other purposes. However, the same issues (e.g., use of PII or not, segregation of PII from online behavioral profile information, or use of dynamic device addresses) that must be addressed for cross-media targeting must also be addressed for cross-media tracking or correlating.

It is therefore desirable to provide systems and methods for tracking and correlating online behavior of, or targeting online advertisements (i.e., any advertisement transmitted to an online user interface device via the Internet, its successor, or another remotely accessible network) to, television viewers based on previous presentation to those viewers of television advertisements, which systems and methods can be implemented despite the use of dynamic device addresses for the user's online access or television service, or while maintaining segregation of the user's PII, television viewing habits, and online behavioral profile information.

SUMMARY

A method implemented using a programmed hardware computer system comprises: in response to a request to deliver an advertisement received from a TVP or STB (or another entity for the STB), causing a television advertisement to be directed to the STB; storing indicia derived from that direction; and taking an action with respect to an online user interface device (such as a computer, game machine, or mobile phone) associated with the STB, which action is either (i) causing delivery to the online user interface device of an online advertisement targeted based on the presumed viewing of the television advertisement, or (ii) identifying a correlation between the presumed viewing of the television advertisement and subsequent online behavior conducted using the online user interface device that is or has been tracked. The STB is indicated, at a time and date the selected TV ad is directed, by a STB identifier. The online user interface device is indicated, at a time and date of the subsequent online behavior or delivery to the online user interface device of the targeted online advertisements, by an online user interface device identifier. The association of the online user interface device and the STB is thought to reveal that the respective users of those devices are either the same person or members of the same household or business.

The association of the online user interface device identifier and the STB identifier can be done before or after the TV ad is directed to the STB. The association of the online user interface device identifier and the STB identifier can be done directly or indirectly; in the indirect case, the online user interface device might be associated with another online user interface device whose identifier is associated at least at some point in time with the STB identifier.

In one implementation, an unaffiliated third-party provider of television service to the user directs the television advertisement to the STB and electronically associates the STB identifier and an online user interface device identifier of that user.

In another implementation, the STB identifier and the online user interface device identifier are electronically associated by sharing a common IP address (or portion thereof), e.g., by being connected to a common LAN through which each is provided with online access. In that implementation, the system and method can include directing the television advertisement to the STB.

In still other implementations, the STB identifier and the online user interface device identifier can be electronically associated in other suitable ways, including by an unaffiliated third party other than the TVP.

To avoid the privacy concerns discussed above, in each of the implementations, the TVP and the STB do not deliver information identifying the television program or television channel being displayed using an identified STB. To achieve that goal while also tracking advertisement delivery, the TVP can report (or keep records for later reporting) delivery of a selected television advertisement within a specific television program or on a specific channel but without a STB identifier.

The systems and methods can further comprise automatically selecting an advertisement and causing it to be directed to an online user interface device associated with the STB (not necessarily the same online user interface device associated with a profile that was used to select the TV ad, in cases where a profile was used in selecting the TV ad). The online user interface device is indicated by an identifier that previously, concurrently, or subsequently is electronically associated with the STB identifier, either directly or indirectly, such as through association with the online user interface device identifier associated with the profile that was used to select the TV ad. Such indirect association allows maintenance of privacy, as explained above. The online advertisement can be selected based at least in part on the indicia derived from the direction of the television advertisement, or based on those indicia and other indicia derived from the subsequent online activity of the user. Often, direction of an advertisement to the online user interface device is responsive to an advertisement request originating from that online device, such as from the device's browser or from another application running on the device. An online activity or another activity of the user on the device can lead to the advertisement being directed to the online device, either before, at the time of, or after the user's activity using the device. Examples of such other user activity are playing games on the device, browsing the web using a browser or another application, watching a video on the device, or another activity.

Objects and advantages pertaining to correlation of online behavior with, or to targeting of online advertisements based on, previous display of a television advertisement may become apparent upon referring to the exemplary embodiments illustrated in the drawings and disclosed in the following description and/or claims.

Figure 1:
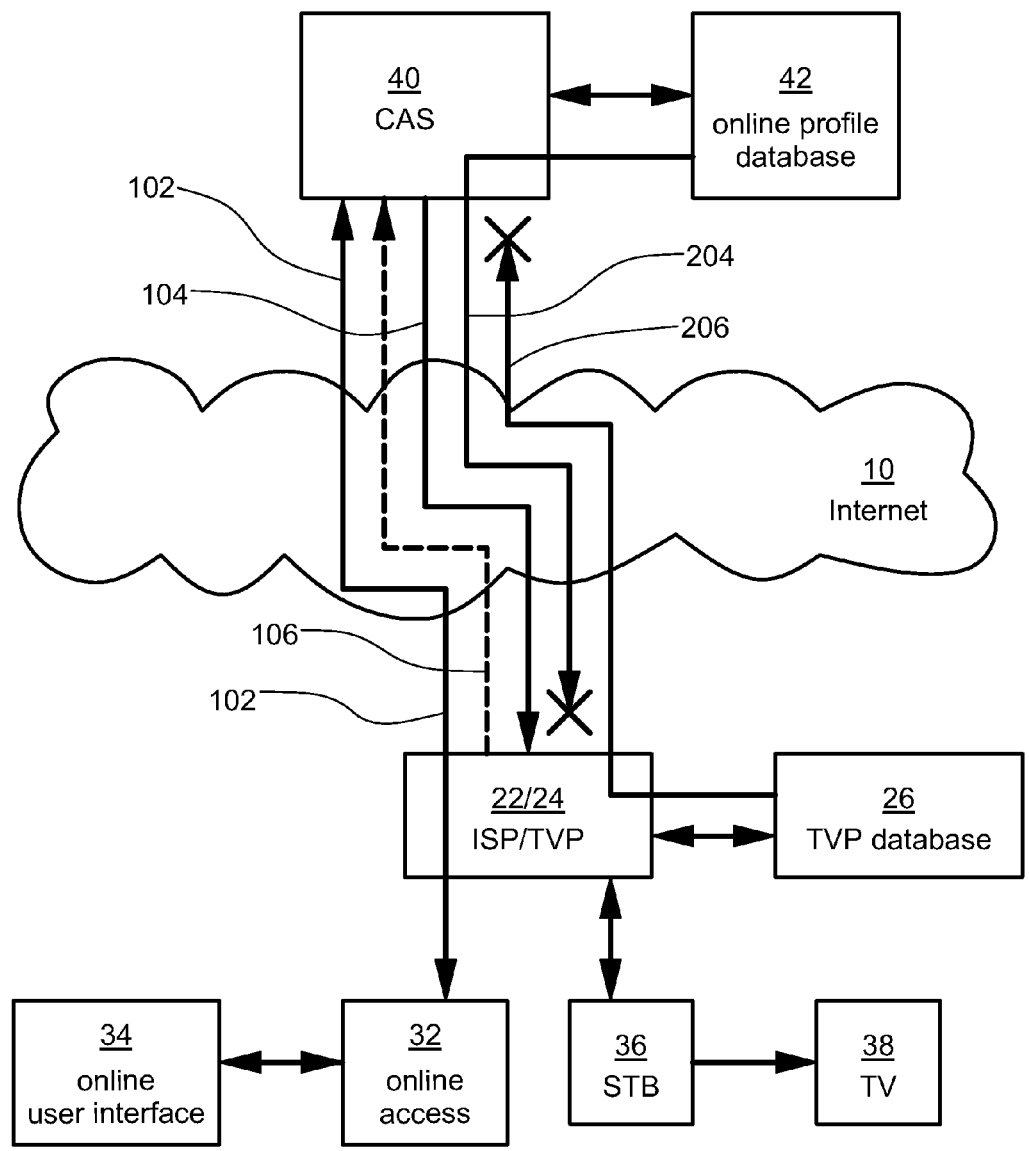
FIG. 1 illustrates schematically an exemplary system for correlating online behavior with, or targeting online advertisements based on, previous display of television advertisements.

The embodiments shown in the drawings are exemplary and should not be construed as limiting the scope of the present disclosure and/or appended claims.

DETAILED DESCRIPTION OF EXEMPLARY EMBODIMENTS

Some of the following implementations generally disclose the following elements, among others: (1) a television advertisement can be caused to be directed to a STB in response to a request by (or for) the STB to deliver a television advertisement, (2) the viewing of that advertisement on the STB is assumed to have occurred, (3) information is recorded indicating that the television advertisement was presumed watched, (4) online user interface devices are tracked, such as by redirecting to a CAS all devices visiting the television advertiser's online site or a section of that site, or another website of interest to the advertiser, which visit indicates the success or partial success of the advertisement shown on the STB, and (5) a report is created that can be of use to the advertiser indicating cases (specific or aggregated) where the tracked online activity on the online user interface device reveals online activity of interest at a time just after the advertisement was delivered to the STB and presumptively watched. Such a report can include indicia identifying the television advertisement, the date and time of its direction to the STB, or the television program or channel in which the television advertisement was directed (but only in aggregated or anonymized form, i.e., without identifying the specific user's STB). The report can also include indicia derived from online visits to tracked sites from the user's online interface device or from other online devices associated with the user's STB or online interface device; those other online devices might belong to the user or to other members of the user's household or place of business. The report can include details of the online visit, e.g., which online site was visited, the date and time of the visit, specific sections, pages, or content viewed at the site, time spent on the site or on specific sections or pages thereof, or online activities performed at the site (such as shopping queries, purchases made, search queries, or links followed).

In one implementation (FIG. 1), an unaffiliated third-party provider of both television service and online access to the user (ISP/TVP 22/24) directs the television advertisement to the STB and electronically associates the STB identifier and the online user interface device identifier. Typically in that implementation, indicia of the STB identifier are neither received from the ISP/TVP 22/24 nor included in the online profile information. In another implementation, the STB identifier and the online user interface device identifier are electronically associated by sharing a common IP address (or portion thereof), e.g., by being connected to a common LAN 300 through which each is provided with online access (FIGS. 2 and 3; in FIG. 2, both online access and television service are provided by ISP/TVP 22/24; in FIG. 3, ISP 22 provides online access and TVP 24 provides television service). In that implementation, the method can include directing the TV ad to the STB. In still other implementations, the STB identifier and the online user interface device identifier can be electronically associated in other suitable ways, including by an unaffiliated third party other than the TVP.

An online advertisement directed to the user interface device can be selected based at least partly on the indicia derived from direction of the television advertisement, or based on both those indicia and the indicia derived from the subsequent online activity. The online advertisement thus selected can be directed to an online user interface device (not necessarily the same one used for the subsequent online activity) that is previously, concurrently, or subsequently indicated by or associated with the online user interface device identifier.

In some implementations a computer program running on the STB is responsible for originating the ad requests. That computer program, in some cases, can originate ad requests only within TV programs for which prearrangements have been made for the ad server to deliver targeted TV ads during those programs.

In one example, the computer program running on the STB that is responsible for originating the ad requests constantly operates on the STB, regardless of the time of day and viewed TV program or TV channel, and operates to originate ad requests whenever there is an available ad slot within a TV program displayed using the STB. In another example, the computer program could be downloaded to the STB and runs only within TV programs within which prearrangements have been made for the ad server to deliver targeted TV ads during those programs. Of course, ad requests originating from the STB could be implemented in other ways as well.

Indicia derived from the selected television advertisement, the subsequent online activity, or the selected online advertisement on the online user interface device can be included in the online electronic profile information of the user (e.g., by being linked in a database or by being stored in one or more cookies on one or more online user interface devices of the user). Depending on the specific implementation, the user online profile information or the electronic association of online user interface and STB identifiers may or may not include personally identifiable information. However, in no implementation does the method include (i) receiving a report from the STB or the TVP of which television program or television channel was being watched using an indicated STB at the time of the direction of the television advertisement, (ii) receiving PII from the TVP, or (iii) transmitting online behavioral profile information to the TVP.

The television advertisement can be selected in any suitable or conventional way, including based on user online profile information (i.e., targeted), geographical location of the STB, offline profile information, the likely audience watching a television program or other criteria.

In one implementation, the following process is utilized to select the TV ad: First, it is determined which television programs are likely being watched on the STB at the time the STB originates an advertisement request, such as by matching the date and time against a list of television program ad slots within which the company running the server is either responsible or allowed to deliver selected TV ads. The ad server can infer that one of the listed TV programs is being watched on the STB that requesting the advertisement, because an ad request wouldn't have originated from that STB during that time slot unless the STB was displaying one of the listed TV programs. Such presumed or probable matches (even though in part based on the timing of the ad request from or for the STB) amount to inferences concerning what the user in question is watching, and thus do not violate the condition that no information regarding a user's program or channel choices be received by the company running the server. Second, a probable match is made between the matching television programs and one or more online user interface devices associated with the STB, whereby it is assumed that a user who is associated with an online user interface device is watching the television program that appears on the list. Third, for each user believed connected to a user interface device, who is presumed to be watching a certain television program, at least one television advertisement is selected based on the profile associated with the online user interface device. Many examples of selecting an advertisement based on the profile associated with an online user interface device are disclosed in various of the patent applications listed above. A few examples include: directing a car television advertisement based on visits to online auto sites; directing a sporting goods television advertisement based on online booking of a golf tee time; or directing an airline television advertisement based on searching for a remote travel destination on an online travel site. Myriad other examples can be imagined or performed and fall within the scope of the present disclosure.

Examples of how a probable match (second step listed above) is made between television programs possibly running on the STB at the time the advertisement request originated from the STB (first step listed above) and online user interface devices associated with the STB follow: A probable match could be based at least in part on the nature of the programming, a user preference for a specific television program or channel that is indicated in the user's online profile (explicitly or inferentially), a match between demographic profile information in the user's online profile and a presumed demographic profile of a program's or channel's audience, or other information in the user's online profile. Examples are disclosed in one or more of the patent applications listed above, particularly application Ser. No. 12/131,798 or 12/131,824.

The user online profile information, online user interface device identifiers, or STB identifiers can be related or electronically associated for many or all of the users of a multitude of users before directing television or online ads to any of the multitude of users. Alternatively, the user profile information, online user interface device identifiers, or STB identifiers can be related or electronically associated for one or a few of a multitude of users at any given time as needed for directing television ads to the STB or ads to the online user interface device, with additional user profiles and identifiers related or electronically associated at later times for directing other television ads to the STB of additional users or ads to the online user interface devices of additional users. The relations or electronic associations can include one or more of (i) an earlier online user interface device identifier and a later STB identifier, (ii) an earlier STB identifier and a later online user interface device identifier, or (iii) contemporaneous online user interface device and STB identifiers. Such differing relations and associations can become necessary, e.g., as IP addresses are assigned and reassigned under DHCP, or as different online user interface devices are connected to or disconnected from a LAN.

The multitude of users can be any set made up of a large number of users and does not necessarily include every user having online access or television service through a particular ISP or TVP. For example, the system described can operate only with respect to a subset of users, such as those users who have capabilities needed to implement this system (e.g., suitable hardware, software, or operating system), those who have done some sort of subscription, or those selected based on criteria as to which operation of the system is considered desirable, less expensive to implement, or profitable. For example, those users might be chosen that have STBs with an operating system, software, or hardware capable of accepting TV ads from a CAS. In any event, the fact that other users may exist as to which the system does not operate is not intended to negate the advantages of the system as to those users for which the system does operate.

Figure 2:
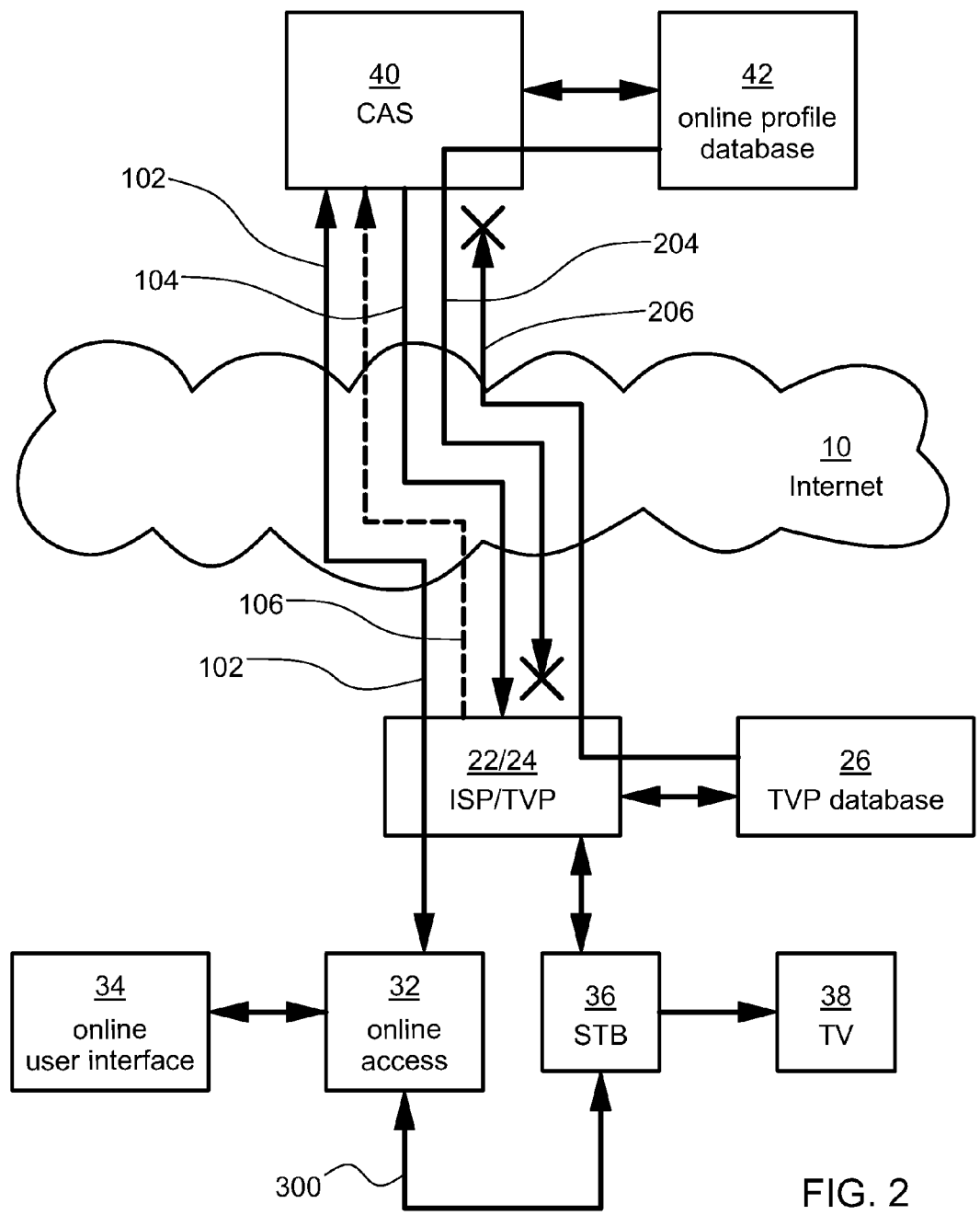
FIG. 2 illustrates schematically another exemplary system for correlating online behavior with, or targeting online advertisements based on, previous display of television advertisements.
Figure 3:
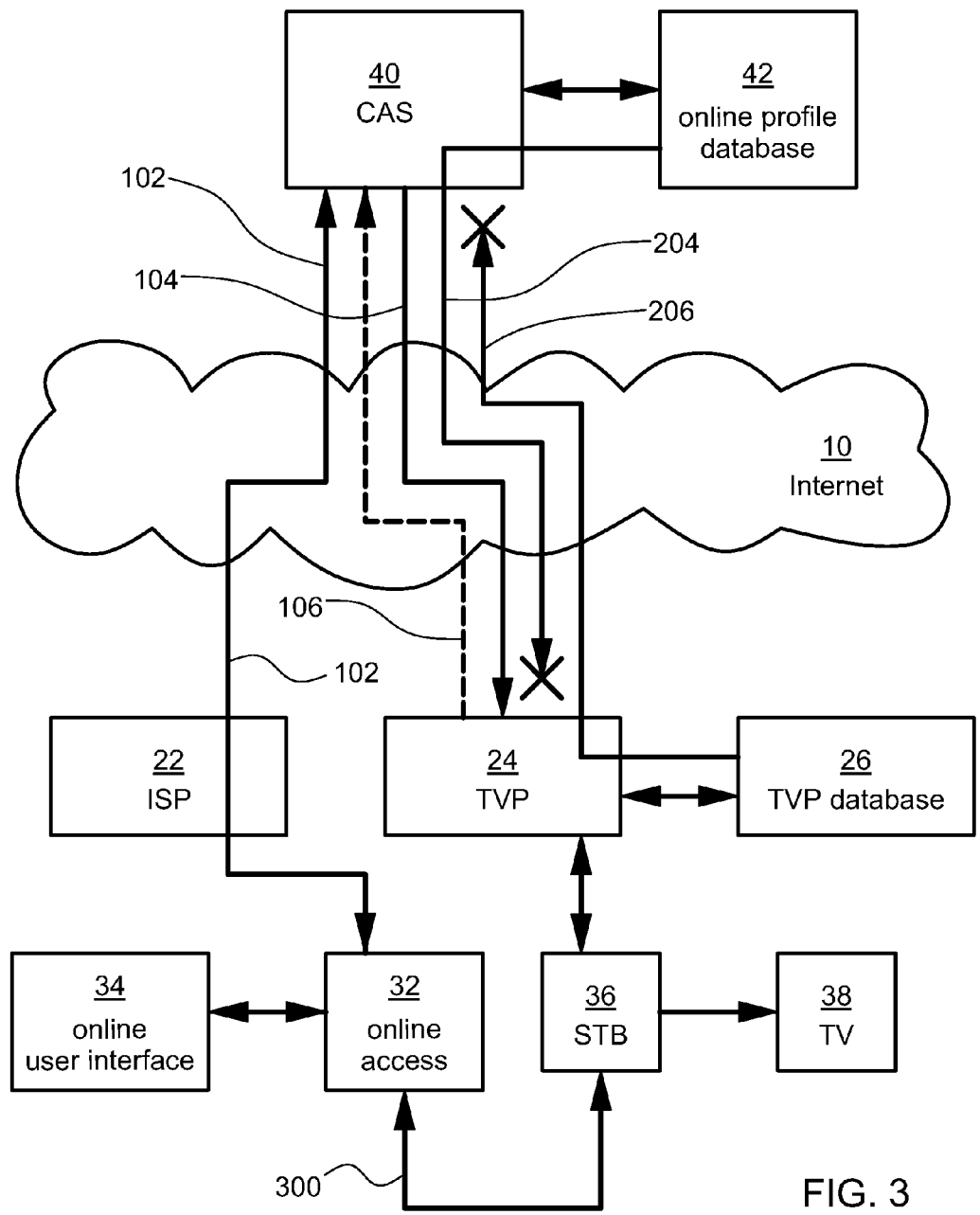
FIG. 3 illustrates schematically another exemplary system for correlating online behavior with, or targeting online advertisements based on, previous display of television advertisements.

Exemplary systems for implementing the various methods disclosed herein are illustrated schematically in FIGS. 1-3. A user's online user interface device 34 (e.g., a computer or network-enabled cell phone) is connected in any suitable way to the Internet 10 (via an integral or separate online access device 32, e.g., a modem, router, or wireless adapter), usually through online access provided by an ISP 22. The user's television 38 is connected for receiving television service through a TVP 24 (via an integral or separate STB 36). The drawing and examples disclosed herein encompass implementations in which the ISP 22 and the TVP 24 are independent entities (FIG. 3) as well as other implementations in which a common ISP/TVP 22/24 provides both services to a given user (FIGS. 1 and 2). In any of the disclosed implementations, an online access IP address is assigned to online access device 32 (e.g., a modem) in any suitable way by the ISP 22. At any given time, any data or content directed for online transmission to the online user interface device 34 is directed to or via the online access IP address assigned to modem 32 at that time. That IP address can be static, but it is more typically the case that the IP address is dynamic, and changes from time to time as each new online access IP address is assigned to the user's modem 32 (by DHCP or other suitable means).

The STB identifier can assume more varied forms, which can be employed alone or in any of various suitable or desirable combinations; in many instances, that STB identifier is known only to the TVP 24. In some television transmission systems, particularly those that employ set-top boxes with only limited functionality (and perhaps no networking functionality), each STB might be assigned an internal identifier (static or dynamic) operative only within the scope of the television transmission infrastructure of TVP 24, but without direct access to or from any outside server, network, or system (FIG. 1). TVP 24 mediates any exchanges of data or content between the STB 36 and any outside server or system (such as central ad server CAS 40, for example). In some television transmission systems, STB 36 might be provided with Internet access via TVP 24 (FIG. 1), in which case the STB 36 might be assigned an STB IP address (static or dynamic) by TVP 24 (and in some cases only the TVP 24 is aware that the STB IP address indicates a STB). In some television transmission systems, STB 36 might be provided with Internet access through its own modem (separate from modem 32 or other online access device; not shown) via an ISP 22 or TVP 24 (which would assign the corresponding STB IP address, statically or dynamically). In some implementations, in addition to the connection between STB 36 and TVP 24, a separate connection between the user's modem 32 and the user's STB 36 (e.g., LAN 300 in FIGS. 2 and 3) can enable the STB 36 also to obtain online access via the same IP address as the user's online access (i.e., via modem 32). In that arrangement (such as an IPv4 based arrangement), only one IP address is "seen" by other servers or computers communicating via the Internet with the user's computer 34 or STB 36 via modem 32 or other online access device. In future embodiments, e.g., after future implementation of IPv6, the online access device 32, computer 34 or other online user interface device, or STB 36 can each have a uniquely assigned IP address (or analog thereof) directly accessible to other servers on the Internet. In such a scenario, the modem 32, the computer 34, and STB 36 typically would share the first 64 bits of a 128-bit address, thereby enabling an electronic association between them. Such future implementations are intended to fall within the scope of the present disclosure. In any implementation in which the STB has an IP address, in addition to any direct transmissions between STB 36 and TVP 24, the STB can exchange data with or receive programming or content from another server or system (such as CAS 40) via the Internet without that other system or server necessarily being aware that the IP address indicates a STB.

In exemplary implementations of systems and methods according to the present disclosure, user online behavioral profile information is derived at least in part from earlier online activity performed using a user's computer 34 at the user's online access IP address through modem 32. When a user engages in online activity, e.g., accessing an online site, the online site can generate a user profile that can include, e.g., a profile identifier and the user's online access IP address that corresponds to the modem 32 at the time the online site is accessed. In one example, the profile identifier can be transmitted to the user's computer 34, e.g., for storage as a tag or a cookie. In another example, the profile identifier can be a username, login name, or other suitable identifier associated with the user, any of which may or may not be stored on the user's computer 34 depending on the specific implementation. Any one or more among the profile identifier, username, login ID, cookie, online access IP address, and so forth can serve as an online access identifier, online user interface device identifier, or a portion thereof. A portion of the user profile information derived from the user's online activity from the online access IP address, including the profile identifier, online user interface identifier, or online access identifier, can be delivered electronically to a central ad server (CAS) 40 (directly from the accessed site, via another profile provider, or via a redirect of the user's computer 34 to the CAS 40, with any of those alternatives being represented schematically in the drawing by arrow 102) and can be stored, e.g., in a profile log or database 42. Instead of or in addition to storage in database 42, the CAS 40 can place (102) one or more cookies or similar tags on the user's computer 34 to store the profile information, to act as a link to profile information in database 42, or act as an online user interface device identifier. A targeted television advertisement is selected by CAS 40 based at least in part on the delivered profile information.

Central ad server (CAS) 40 can then cause the selected television advertisement to be directed to the user's STB 36 by TVP 24 (FIG. 1). The TVP 24 and the entity that controls CAS 40 (e.g., a profile provider) are unaffiliated, but cooperating, entities. An electronic transmission from CAS 40 to TVP 24 (represented schematically in the drawing by arrow 104) causes direction of the selected television advertisement to the user's STB 36 in response to a request for an advertisement from (or for) STB 36. The nature of that transmission can vary considerably and can include, e.g., the user's online access IP address or other online user interface device identifier, indicia identifying the selected television advertisement, indicia of the selected advertisement itself, or indicia of a television program or time interval during which the advertisement is to be presented. However, the transmission from the profile provider to the TVP 24 does not include indicia of the user's online behavioral profile information (obtained from either the user's computer 34 or from the database 42), to maintain segregation of that information from the user's PII (typically known by TVP 24); that segregation is represented schematically by the truncated arrow 204 in the drawing.

The targeted television advertisement can be directed by CAS 40 to the user's STB 36 via ISP 22 if modem 32 and STB 36 share the online access IP address (e.g., directed via link 102 and LAN 300 in FIGS. 2 and 3), or via TVP 24 using an associated STB identifier (e.g., via link 104 in FIGS. 1-3). The association between the online access IP address (or other online user interface device identifier) for the earlier online activity and the STB identifier can be established in any suitable way, that may or may not include participation of TVP 24, including but not limited to those disclosed in one or more of the patent applications listed above, particularly application Ser. No. 11/736,544, 11/968,117, or 12/257,386. For example, an electronic association between the user's online user interface device identifier and STB identifier can be established by TVP 24 by, e.g.: use of PII or non-PII as needed, desired, or permitted, by a TVP or TVP/ISP; use of a common identifier or user pseudonym for a user's modem and STB by an ISP/TVP; use of a common online access IP address (or portion thereof) used by both modem 32 and STB 36 (IP addresses established according to IPv4, IPv6, or other future developed IP protocols); cooperation between ISP 22 and TVP 24 to associate the respective identifiers, with or without using PII.

In some examples, an online user interface device identifier in the form of a cookie or tag can be placed on the user's online user interface device (e.g., computer 34). In some examples, cookies, tags, pseudonyms, or other identifiers can be updated as IP address are dynamically assigned or reassigned. In some examples, the electronic associations of identifiers can be stored in a log, history, or database (e.g., database 26 maintained by TVP 24, or database 42 maintained by CAS 40), and can be updated at any suitable regular or irregular time intervals; for purposes here, the term "database" shall be deemed to encompass such collections of data associating the specified identifiers, regardless of the format in which the information is kept or how it is connected or associated. In some examples, the electronic association of identifiers can be performed in real time. In some examples, an electronic association of identifiers can be established or updated based on analysis of IP addresses, dates, and times of selected user actions (online or via the television), with or without using additional or auxiliary identifiers or confirming data. In all of those examples, the profile provider receives from TVP 24 the ad request but no information identifying the television program or channel in which the television advertisement was directed for a specific identified STB, nor the user's PII (e.g., from a TVP database 26; represented by the truncated arrow 206 in the drawing), and TVP 24 receives from the profile provider no online behavioral profile information pertaining to the user (represented by the truncated arrow 204 in the drawing), thereby ensuring that the user's PII (typically known to TVP 24) remains segregated from the user's online behavioral profile information (known by the profile provider).

Once requested (by STB 36, or alternatively by TVP 24, by CAS 40, or by another online entity) or otherwise determined that delivery of an advertisement is desired, the delivery of the targeted television advertisement to the user's STB 36 can be achieved in a variety of ways. The advertisement can be pre-stored on CAS 40 and transmitted from CAS 40 to the user's STB, with the assistance of TVP 24 (represented by arrow 104 in FIGS. 1-3), or without the assistance of TVP 24 (represented by arrow 102 and LAN 300 in FIGS. 2 and 3). The advertisement can be pre-stored on CAS 40 by virtue of it having been transmitted (i) from an accessed online site, (ii) from another online site, (iii) from another ad server, ad network, rep firm, ad exchange, ad agency, or advertiser, or (iv) from another entity. Alternatively, the targeted television advertisement can be transmitted directly to the user's STB 36 from a server or ad server operated or used by (i) a visited online site, (ii) a profile provider other than the one operating the CAS, (iii) another online site not visited by the online user interface device, (iv) ad network, (v) rep firm, (vi) ad exchange, (vii) ad agency, (viii) advertiser, or (ix) another entity, without the pre-storing step onto CAS 40. In another case, the user's STB 36 can be instructed by CAS 40 to retrieve the advertisement directly from any of the above entities (i)-(ix), using for example the URL given to the CAS 40 by respective entity. In any of the alternatives, the television advertisement need not be transmitted directly to STB 36; instead it can be transmitted through one or more intermediate servers (i.e., CAS 40, a server hosted by an ISP, a TVP, a cable company, or a telecommunications company, for example). The television advertisement can be streamed or otherwise delivered for real-time viewing, or it can be delivered to the user's STB 36 or an associated digital video recorder (DVR) for later viewing. In any of those cases, the ad source, i.e., any of the above entities (i)-(ix), can presume that the advertisement directed to STB 36 has been viewed, as described herein. In cases where the advertisement was pre-stored, such as at CAS 40, the ad source entity can presume that the advertisement was viewed at the time and date for delivery specified in the prestoring instruction (with or without a notification from CAS 40 to the ad source that CAS 40 directed the TV ad to STB 36).

After one or more TV ads are delivered to the STB and presented on a television, STB 36 can report to CAS 40 which TV ads were delivered within which television programs. Regardless of the specific implementation or system architecture, that report typically is made to CAS 40 via an intermediary server. Such intermediate server can be an "ad selection engine" server, an EBIF server that also fulfills the reporting function, or a separate, dedicated server. The intermediary server anonymizes or aggregates the data so that CAS 40 never learns which television programs or channels were watched on any specific STB identified by a STB identifier or by an online user interface device identifier associated with the specific STB, nor any PII pertaining to the user (this limitation is represented schematically by the truncated arrow 206 in the drawings). Reports from the intermediary server can occur following each TV ad delivery or can be accumulated and reported in aggregate at any suitable or desirable time interval. The reported data enable proper charging or crediting of revenue based on presentation of particular TV ads during given TV programs.

CAS 40, an accessed online site, or another profile provider can transmit (directly or indirectly) to TVP 24 or STB 36 instructions or a request to provide a notification when the selected television advertisement is presented on the user's television 38 (represented schematically by dashed arrow 106 in the drawing). Alternatively, such a notification can be provided according to a prearrangement, without a specific request for each such notification. The notification can be transmitted from TVP 24, from the user's STB 36, or from a server that participated in or is aware of the delivery of the television ad to STB 36, to CAS 40 (in any of those cases perhaps also via one or more intermediate servers).

The notification typically originates from the STB 36, and typically includes indicia identifying the television advertisement as well as the television program or channel in which the advertisement was delivered. To avoid user/viewer privacy concerns, information tied to the specifically indicated STB 36 should be removed from any notification transmitted to CAS 40 (represented schematically by truncated arrow 206), even though that information may not constitute PII. Regardless of the connections between STB 36 and any of ISP 22, TVP 24, or CAS 40 (i.e., in any of the arrangements of FIGS. 1-3), in one example, the notification can be routed through an intermediate server of TVP 24, stripped of such specific STB identification information or data, and then transmitted to CAS 40 (individually, or aggregated with other such notifications from other STBs). Any suitable notification scheme can be employed that reveals to CAS 40 neither a specific STB identifier nor identifiers of online access or online user interface devices associated with the STB.

If STB 36 is capable of communicating the report directly to CAS 40 without revealing any unique STB identifier or any online user interface device identifier associated with the STB, then such a direct report can be employed, and an intermediary server is not necessary. However, direct reporting typically would not be done if STB 36 communicates directly with CAS 40 through an IP address via a shared LAN, because CAS 40 could use the IP address to identify online user interface devices sharing the LAN with STB 36 and therefore link the viewing of a TV program or TV channel reported by STB 36 with online profiles of the online user interface devices sharing the LAN with STB 36 (and therefore associated with STB 36). Even though online user interface devices are typically not associated with PII, the association of reported TV viewing on a single STB with an online user interface device might create an impression of tying reported TV viewing on a single STB with an individual, which is considered unacceptable to many privacy advocates, in contrast to the reporting of aggregate number of TV ad views on many STB, which is considered acceptable.

Instead of receiving a notification from STB 36 of the display of the television advertisement using STB 36 (i.e., the notification identifies a specific STB), the CAS 40, a profile provider, or any of the above entities (i) to (ix) can simply assume that the television advertisement has been viewed after it was directed to the STB 36 (or after such a direction was initiated), and proceed as described below as if a notification of that viewing had been received (hence the dashed arrow 106). Such a "no notification" implementation eliminates administrative, computational, or bandwidth overhead arising from the STB 36 generating or transmitting the notification, or from the CAS 40, a profile provider, or any of the above entities (i) to (ix), awaiting, logging, or processing the notification. In addition and importantly, a "no notification" implementation can mitigate privacy concerns that might arise from users receiving television service from TVP 24, from user advocacy groups, or government regulators.

Despite the lack of PII identifying a specific subscriber in such a notification, users or regulators still might be uncomfortable with TVP 24 sending notifications that identify the viewing of a specific television program or channel using an identified STB, or TVP 24 still might be concerned that such notifications might appear to, or actually, violate user privacy policies or regulations. As compared to the notification-based implementations, the "no notification" implementation provides many of the same advantages and benefits, without raising such privacy concerns. Although mitigating privacy concerns, the "no notification" implementation has the drawback that the television advertisement may not have been directed or viewed, which might, for example, skew the accuracy of any subsequent online tracking data or waste online advertising opportunities on the wrong follow-on advertisements.

After the television advertisement is directed and presumed viewed (with or without a notification), when the user again accesses one or more online sites or conducts other online activity through modem 32 (arrow 102 in the drawing), the profile identifier can be transmitted to one or more of those sites or to CAS 40, to a profile provider, or to any of the above entities (i)-(ix) (e.g., by reading the cookie or tag stored by computer 34, or by receiving a username, login name, or other suitable online user interface device identifier or online access identifier).

As a result, one of those accessed sites, CAS 40, a profile provider, or any of the above entities (i)-(ix), or a server operated or used by any of them, or another server controlled by another party can continue (or begin) to track and record the user's online activities via modem 32, i.e., can begin or continue to store, e.g., on the user's computer or in a profile database, information pertaining to the online activity on the online user interface device after presumed viewing of the television advertisement.

The current online access IP address for modem 32 may or may not be the same as that used to when earlier online profile information was tracked and recorded, but it can nevertheless be associated with earlier online profile information in any suitable or conventional way, including those disclosed in one or more of the patent applications listed above. One of those accessed sites, CAS 40, a profile provider, or any of the above entities (i)-(ix), or a server operated or used by any of them, or another server controlled by another party, can correlate the subsequently collected online profile information with the presumed viewing by the user of the selected television advertisement. That correlation can in turn be used for a variety of purposes, as described below.

In one example, the correlation can be used to gauge the effectiveness of the television advertisement, for driving later online sales or merely driving traffic to an online site. For example, an observed increase in the likelihood of a user purchasing online airline tickets from a specific airline, or merely visiting the airline's online site, can be correlated with the user having previously been presumed to have viewed a television advertisement for that airline. The effectiveness of differing television advertisements, or combinations or sequences of advertisements, can be compared by comparing subsequent online behavior of viewers presumed to have seen the respective ads. The correlation can consider online activity during a predefined or selected time period, such as one hour, one day, or 14 days after the presumed viewing of the television advertisement, or another predefined or custom-specified time period.

The company doing the correlation cannot tell an advertiser for sure that a particular channel/program, or a particular TV ad within a channel/program, was displayed using an identified STB, because CAS 40 (or other entities outside the TVP) is not told that information. Nevertheless, if a visit is made to an advertiser's online site (or some other defined site) shortly after direction to the STB of an advertiser's specific ad, then it can be inferred that a household member watched the TV ad and that the ad had some impact.

In some implementations, it might be desired to track not only a single computer but also other online devices associated with the same user or other members of a household or on a common LAN. Suppose, for example, activity on a wife's computer triggered selection of a particular television advertisement. Or suppose that presentation of the television advertisement on the STB was linked only to an online profile of the wife's computer, as opposed to also linked to a profile derived from online activity through a mobile device such as a cell phone of the wife. As an alternative or in addition, it might be desired to track a husband's computer or a cell phone device (of either husband and wife), the wife's computer, and even possibly online user interface devices of other household members, to track the effect of the television advertisement on other household members who might have seen the television advertisement also, or who might have heard about the advertiser's product or service from other household members who viewed the television advertisement and as a consequence were interested in the advertiser's product (good or service), even though the television advertisement was not selected to be targeted to that person, i.e., was not based on that person's profile information.

For illustration, suppose the wife had searched for a new minivan online, and that search caused presentation of a minivan advertisement on a STB in that household, but further suppose that the wife had been performing the search following a discussion with her husband. Further suppose that, after seeing the minivan television advertisement, the husband uses his computer to visit a minivan manufacturer's website to learn more about the product, schedule a test drive, buy the van, or otherwise act in a way indicating interest in the advertised product. In such an illustration, tracking other devices associated with the same household and noticing correlations within a specific time period after delivery of the television advertisement would better detect advertisement effectiveness and facilitate more robust reporting to the television advertiser.

Instead of, or in addition to, the tracking, recording, and correlating of subsequent online activity (i.e., receiving and storing on the user's device 34 or in database 42 electronic indicia derived from online activity of the user) that is enabled by the electronic association of an STB identifier with an online user interface device identifier (using methods disclosed in one or more of the patent applications listed above and described only briefly herein), that electronic association can allow an advertiser to transmit one or more selected (i.e., targeted) online advertisements to the user's computer 34 via modem 32 (arrow 102), as a follow-up to the user's presumed viewing of the selected television advertisement. The selected online advertisement can be targeted based on any suitable or desirable criteria, including presumed viewing of the TV ad or other online user profile information (collected based on activity before or after the TV ad is directed to the STB 36). Such presentation of targeted online advertising via an online user interface device as a follow-up to television advertising can be employed to increase the effectiveness of combined online and television advertising over that of either advertising medium alone. That effectiveness is not substantially diminished by the segregation of the user's online behavioral information (known to the profile provider) from the user's PII (known to the TVP).

The targeted online advertisement delivered to the online user interface device can be selected based on the nature of the television advertisement viewed (or presumed viewed), and optionally also on user online profile information, in any suitable or conventional way. By way of analogy with examples given above for selecting a targeted TV ad, a few examples of targeted online ad selection can include: directing an online car ad based on viewing a television car ad; directing an online ad for a golf course after viewing a television ad for golf equipment; or directing an online airline ad based on viewing a television ad for a remote travel destination. Myriad other examples can be imagined or implemented and fall within the scope of the present disclosure.

Additional targeting criteria can be employed to direct targeted ads to online user interface devices or to track and record online behavior from online user interface devices, based on information concerning a TV ad delivered (or presumed delivered) to the associated STB. Examples of such targeting criteria are disclosed in one or more of the applications cited above and can be similar to criteria for targeting the TV ad. Even when the online user interface device (or group of devices sharing a network address) is determined, in some instances that device can be used by multiple users. In such instances, online ads can also be targeted to the online user interface device, or online activity of the user interface device tracked, based on information concerning the TV ad directed to the associated STB, but further taking into consideration the particular online activity on the online user interface device at a given time (e.g., type of online content viewed or online searches performed). For example, an online ad for an alcoholic beverage might be suitable for presentation on an online sporting news site, but not at the Disney site. Suitable online sites of content on which to show a targeted online ad can therefore be selected at least in part on the nature of the online site or content, the nature of the online ad, or user online profile information. Similarly, in any of the implementations including delivery of online ads, the user's computer 34 or other online user interface device can be configured to filter the targeted advertisements delivered thereto, based on selected user preference or other suitable criterion. Examples are disclosed in one or more of the applications cited above.

The profile provider (e.g., the proprietor of CAS 40 or an accessed online site) or another online entity (that uses or benefits from use of the profile information) can send an electronic communication to CAS 40, preferably automatically, such as by having the profile provider's server pre-programmed to send such electronic communication or by having the profile provider's server redirect the online user interface device along with the electronic communication, which electronic communication contains information useful to CAS 40 in (i) tracking of online behavior from the online user interface device 34 (or storing on the user's device 34 or in the database 42 of online profile information pertaining to that activity) and correlating of that behavior with the viewed TV ad, or (ii) causing a selected online ad to be transferred to the online user interface device 34 at the proper time. The electronic communication can take a variety of forms, and can include, but is not limited to, one or more of: (1) an indicator of information about the user (likely not PII), such as profile information (e.g., online sites, site sections, or pages visited; online searches or online activity conducted) or a code or keyword to access that information in a database, online access identifiers, online user interface device identifiers, IP addresses, times and dates of online site visits or TV ads viewed (or presumed viewed), (2) an indicator describing user activity (previous online or television ads viewed or presumed viewed) or user interests, or (3) an indicator of which online ad should be transmitted, such as a URL or ad title given by the profile provider to retrieve the correct online ad from a corresponding ad server, or the actual online ad itself. The electronic communication can be sent following every contact with an online user interface device or for each instance of a user's presumed viewing of a television advertisement, or a list can be created and transmitted at suitable intervals containing information about a number of viewed TV ads. In some instances, the electronic communication can be delivered before the corresponding TV ad is delivered, with the instructions in the communication to be executed after presumed viewing of the TV ad.

Whatever the manner of the electronic association between the user's STB identifier and online user interface device identifier, that association can in some instances be maintained even if the online user interface device 34 is a mobile device (e.g., an Internet-enabled cell phone, handset, PDA, or laptop computer) that is intermittently disconnected from modem 32 and is connected to the Internet through another connection (e.g., another LAN, a wireless hotspot, or a cell phone network, as in FIG. 9). Examples are disclosed in one or more of the applications cited above, and several are given below. Once the association is established, profile information (both behavioral and demographic) collected about a mobile device such as a cell phone (before or after the association was established) can be used to target television ads to the associated STB, regardless of the IP address used by the mobile device to access the Internet at the time the profile data were collected. Similarly, once the association is established, profile information collected about the mobile device (before or after the association was established) can be correlated with the presumed viewing of the television advertisement, or a follow-on advertisement can be directed to the mobile device, regardless of the IP address used by the mobile device.

For example, consider a common scenario where a laptop computer, used both at home and in the office, is used at home using a home IP address and a corresponding cookie or tag is placed on it by a CAS to act as an online user interface device identifier. The CAS can collect and store in a database online profile information that can include the home IP address or identity of an ISP/TVP that provides the home online access. The next day, the laptop is taken to work, where it is used for online access and at some point is redirected to the CAS. The CAS, reading its own cookie that was placed on the laptop, requests that the corresponding ISP/TVP direct a targeted TV ad to the user's STB. The TV ad can be targeted based on the user's current online behavior (e.g., while at work) or based on the user's previous online behavior (e.g., while at home). The ISP/TVP directs the ad without passing back to the CAS any PII of the user. In the evening, when the laptop user returns home and turns on the TV, the user will see the targeted TV ad, even if the user left the laptop at work that day. After the TV ad is shown, the user's subsequent online activity (whether at work or at home) can be tracked and corresponding profile information stored in a database or correlated with the viewed TV ad for evaluation purposes, or online ads related to the TV ad can be presented on the laptop (at work or at home).

In any of the implementations including delivery of targeted online ads or targeted television ads, the ads can be provided by a wide variety of sources or entities, and revenues can be generated and distributed in a wide variety of ways. Examples are disclosed in one or more of the applications cited above. In various examples, a profile provider can be compensated for enabling targeting of a television advertisement (based on online profile information) as well as targeting an online advertisement (based on actual or presumed viewing of the television ad). In another implementation, a profile provider could be compensated for providing information that is used in measuring the effectiveness of television advertisements.

For example, if following the presumed viewing of a Nissan Murano (an SUV) TV ad on a STB, an associated online user interface device is used to research the Nissan Murano on cars.com (a car review site), if cars.com redirects all visitor computers that read reviews of the Nissan Murano on cars.com to the CAS, then as a consequence of the redirect, the CAS can recognize the visit from the online interface device associated with the STB where the Nissan Murano television advertisement was presumed viewed. Such information can be very valuable for the advertiser. The advertiser or an advertiser representative (such as an ad agency), or an entity providing the advertiser with the service of measuring the effectiveness of the advertiser's TV ads as reflected by follow-up online behavior, could compensate cars.com for redirecting to the CAS those computers that visit cars.com's Nissan Murano review section.

The TV ads directed to STBs at the request of a profile provider can come from a variety of sources. Likewise, online ads directed to online user interface devices can come from a variety of sources. In one example, a given profile provider can request that the CAS direct an advertisement to the user's STB or online user interface device from (or on behalf of) the profile provider itself (if, for example, the profile provider is an online advertiser site interested in delivering TV ads to people that visited its online site) or from another entity that sells ad space to advertisers, some of whom may desire to present ads to the profile provider site's presumed audience. In that example, the proprietor of the CAS, as the facilitator of the targeted ad delivery, can receive a payment from the profile provider. The CAS proprietor can keep a share of revenue as a commission and pay the TVP for the ad space (except in the case where the CAS proprietor owns the ad space). The TVP can either retain the entire amount paid by the CAS proprietor, if the TVP owns the TV ad space within which the TV ad was delivered, or the TVP can pay some or all of the amount paid by the CAS proprietor to another entity such as a TV broadcasting network, if the TVP does not own the ad space.

In another example, the CAS can pay the TVP for electronically associating the online user interface device and STB, pay a television ad space seller for the TV ad space, and pay an online site (or profile aggregator) for the use of its profile data in targeting the TV ad (unless the online site sold the TV ad or requested its delivery).

In still another example, the CAS can record which entity is entitled to what payments, and payments are made directly from the television ad space seller or television advertiser to the various entitled entities, based on the CAS's records.

In an example wherein the STB is provided by a third party other than the TVP (such as a service provider like Tivo), the STB provider can arrange with content owners (such as a TV broadcasting network) to have the service provider's STBs replace broadcasted TV ads with targeted TV ads, where a targeted TV ad is available, and the service provider and the TV broadcasting network can share the revenue with the CAS proprietor as discussed above. In some cases, the CAS can be owned by a TVP, an ISP, an STB provider, an online site, an advertiser, an advertising agency, an advertiser representative, an online ad space seller, a TV ad space owner, or a TV content provider, in which case the payments will be divided in accordance to the respective roles. In general, a payment from a TV advertiser is used to pay the TV ad space owner and the entities facilitating the delivery of the targeted TV ad.

In another example, the online site or other profile provider can request that a television ad be directed to the user's STB from another advertiser of its own choosing to whom the online site has sold an amount of television advertising space, or that an online ad be directed to the user's online user interface device from another advertiser of its own choosing to whom the profile provider has sold an amount of online advertising space. In that example the profile provider or online site can collect a revenue amount from the site-chosen advertiser while paying the CAS, ISP, TVP, ISP/TVP, or ad space owner(s) in return for assisting to facilitate delivery of the ad(s) provided by the site-chosen advertiser.

In another example, the profile provider provides a profile to the CAS in return for a payment triggered (1) every time the provided profile (whether including behavioral or demographic data) is used to deliver a TV ad, (2) when a TV ad that has been delivered using the provided profile generates revenues, (3) every time the provided profile (whether including behavioral or demographic data) is used to deliver an online ad, (4) when an online ad that has been delivered using the provided profile generates revenues, or (5) simply on account of delivery of the profile without regard to whether, how often, or how effectively it is used.

The TV or online advertisement itself can be sold by the CAS, ISP, TVP, ISP/TVP, STB provider, TV ad space owner, or any third party such as a re-seller or a firm that represents ad space owners or profile providers and sells to advertisers. In that example the profile provider can collect a revenue amount from any of the entities benefiting from the delivery of the TV or online ad based on the profile provided by the profile provider, including the ad space owner, STB provider, CAS, ISP, TVP, ISP/TVP, or a third party selling the targeted ad space. The profile provider, re-seller, or the other advertisers can also pay a revenue amount to the CAS, ISP, TVP, or ISP/TVP in return for directing the ad to the STB.

The systems and methods disclosed herein can be used to generate revenue in a variety of ways for various of the involved entities, not limited to the examples given here, that fall within the scope of the present disclosure or appended claims. The terms "pay," "collect," "receive," and so forth, when referring to revenue amounts, can denote actual exchanges of funds or can denote credits or debits to electronic accounts, possibly including automatic payment implemented with computer tracking and storing of information in one or more computer-accessible database. The terms can apply whether the payments are characterized as commissions, royalties, referral fees, holdbacks, overrides, purchase-resales, or any other compensation arrangements giving net results of split advertising revenues as stated above. Payment can occur manually or automatically, either immediately, such as through micro-payment transfers, periodically, such as daily, weekly, or monthly, or upon accumulation of payments from multiple events totaling above a threshold amount. The systems and methods disclosed herein can be implemented with any suitable accounting modules or subsystems for tracking such payments or receipts of funds.

The methods disclosed here are typically performed using software of any suitable type running on one or more computers, one or more of which are connected to the Internet. The software can be self-contained on a single computer, duplicated on multiple computers, or distributed with differing portions or modules on different computers. The software can be executed by one or more servers, or the software (or a portion thereof) can be executed by an online access device used by the electronic visitor (e.g., a desktop or portable computer; a wireless handset, "smart phone," or other wireless device; a personal digital assistant (PDA) or other handheld device; a television or STB). Software running on the visitor's online access device can include, e.g., Java™ client software or so-called adware. A method for providing collected profiles can include downloading such software to an electronic visitor's online access device to perform there one or more of the methods disclosed herein.

The profile information described can be included as a portion of the tags or cookies placed on a visitor's device, or the tags or cookies can merely include an identifier associated with the visitor's profile that is stored elsewhere (e.g., in a database on a profile owner server, profile supplier server, or media property server). The profile information need not be stored in a single location or under the control of a single entity, nor does control or use of the profile information need to be performed at a single location or under control of a single entity.

The systems and methods disclosed herein can be implemented as general or special purpose computers or servers or other programmable hardware devices programmed through software, or as hardware or equipment "programmed" through hard wiring, or a combination of the two. A "computer" (e.g., a "server" or an online access device) can comprise a single machine or processor or can comprise multiple interacting machines or processors (located at a single location or at multiple locations remote from one another). A computer-readable medium can be encoded with a computer program, so that execution of that program by one or more computers causes the one or more computers to perform one or more of the methods disclosed herein. Suitable media can include temporary or permanent storage or replaceable media, such as network-based or Internet-based or otherwise distributed storage of software modules that operate together, RAM, ROM, CD ROM, CD-R, CD-R/W, DVD ROM, DVD±R, DVD±R/W, hard drives, thumb drives, flash memory, optical media, magnetic media, semiconductor media, or any future storage alternatives. Such media can also be used for databases recording the information described above.

It is intended that equivalents of the disclosed exemplary embodiments and methods shall fall within the scope of this disclosure or appended claims. It is intended that the disclosed exemplary embodiments and methods, and equivalents thereof, may be modified while remaining within the scope of this disclosure or appended claims.

In the foregoing Detailed Description, various features may be grouped together in several exemplary embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed exemplary embodiment. Thus, the appended claims are hereby incorporated into the Detailed Description, with each claim standing on its own as a separate disclosed embodiment. However, the present disclosure shall also be construed as implicitly disclosing any embodiment having any suitable combination of disclosed or claimed features (i.e., combinations of features that are not incompatible or mutually exclusive) that appear in the present disclosure or the appended claims, including those combinations of features that may not be explicitly disclosed herein. It should be further noted that the scope of the appended claims do not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof, wherever they appear, shall be construed as open ended terminology, with the same meaning as if the phrase "at least" were appended after each instance thereof.

In the appended claims, if the provisions of 35 USC §112 ¶6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶6 are not intended to be invoked for that claim.

What is claimed is:

1. A method implemented (i) in connection with television programs or television channels received at a first set-top box from a television service provider and (ii) using a programmed hardware computer system controlled by an entity independent of the television service provider, the method comprising:
    (a) with the computer system, using a list of television programs within which the entity is responsible for delivering advertisements or allowed to deliver advertisements at a time specified by an ad request, automatically recording presumed viewing of a first television advertisement directed to the set-top box; and
    (b) with the computer system, based on the presumed viewing of the first television advertisement via the set-top box, automatically causing an action to be taken with respect to an online user interface device that is electronically associated with the set-top box;
    (c) wherein the computer system records the presumed viewing and causes the action to be taken (i) without receiving information, originating from the television service provider or from the set-top box, indicating which television program or television channel is displayed using the set-top box at the time specified by the ad request, and (ii) without receiving information, originating from the television service provider or from the set-top box, indicating whether the first television advertisement was displayed using the set-top box.

2. The method of claim 1 further comprising, using the computer system, automatically transmitting an electronic report to a third party concerning the first television advertisement, wherein the report lacks specific indicia of set-top box identifiers and includes indicia of only aggregated data pertaining to the television programs or channels displayed using set-top boxes at the time specified by the ad request.

3. The method of claim 1 wherein the action of part (b) comprises, using the computer system, automatically detecting, from indicia derived from online activity using the online user interface device, that the online activity during a select period of time after presentation of the first television advertisement using the set-top box included one or more predefined online activities of interest.

4. The method of claim 1 wherein the action of part (b) comprises:
    (i) using the computer system, automatically selecting a second advertisement based at least in part on the presumed viewing of the first television advertisement; and
    (ii) using the computer system, automatically causing the second advertisement to be directed to the online user interface device.

5. The method of claim 1 further comprising, using the computer system, automatically selecting the first television advertisement based at least in part on indicia derived from previous online activity using one or more online user interface devices associated with the set-top box.

6. The method of claim 5 further comprising, using the computer system, automatically causing the first advertisement to be directed to the set-top box.

7. The method of claim 5 wherein the indicia are derived from previous online activity using at least one online user interface device different from the online user interface device of part (b).

8. The method of claim 1 further comprising, using the computer system, automatically transmitting electronic indicia to the television service provider that enables the television service provider to electronically associate a set-top box identifier of the set-top box and an online user interface device identifier of the user interface device, without causing online behavioral profile information pertaining to a user of the online user interface device to be transmitted to the television service provider, and without receiving from the television service provider personally identifiable information pertaining to the user.

9. The method of claim 8 wherein the television service provider also provides online access to the user via the online user interface device.

10. The method of claim 1 wherein the set-top box identifier is electronically associated with the online user interface device identifier based on a common IP address, wherein network traffic is routed via the common IP address to both the set-top box and the online user interface device.

11. The method of claim 1 further comprising, with the computer system:
    (i) using the list of television programs within which the entity is responsible for delivering advertisements or allowed to deliver advertisements at a time specified by an additional ad request, automatically recording presumed viewing of one or more additional television advertisements directed to the set-top box; and
    (ii) based on the presumed viewing of each of the additional television advertisements via the set-top box, automatically causing one or more additional actions to be taken with respect to one or more online user interface devices that are electronically associated with the set-top box;
    (iii) wherein the computer system records the presumed viewing of the one or more additional television advertisements and causes the one or more additional actions to be taken (A) without receiving information, originating from the television service provider or from the set-top box, indicating which television program or television channel is displayed using the set-top box at the time specified by the additional ad request, and (B) without receiving information, originating from the television service provider or from the set-top box, indicating whether the one or more additional television advertisements were displayed using the set-top box.

12. A machine comprising a hardware computer system, controlled by an entity independent of a television service provider, that is programmed to perform a method implemented in connection with television programs or television channels received at a first set-top box from the television service provider, the method comprising:
   (a) using a list of television programs within which the entity is responsible for delivering advertisements or allowed to deliver advertisements at a time specified by an ad request, automatically recording presumed viewing of a first television advertisement directed to the set-top box; and
   (b) based on the presumed viewing of the first television advertisement via the set-top box, automatically causing an action to be taken with respect to an online user interface device that is electronically associated with the set-top box;
   (c) wherein the computer system records the presumed viewing and causes the action to be taken (i) without receiving information, originating from the television service provider or from the set-top box, indicating which television program or television channel is displayed using the set-top box at the time specified by the ad request, and (ii) without receiving information, originating from the television service provider or from the set-top box, indicating whether the first television advertisement was displayed using the set-top box.

13. The machine of claim 12 wherein the computer system is further programmed to automatically transmit an electronic report to a third party concerning the first television advertisement, wherein the report lacks specific indicia of set-top box identifiers and includes indicia of only aggregated data pertaining to the television programs or channels displayed using set-top boxes at the time specified by the ad request.

14. The machine of claim 12 wherein the action of part (b) comprises automatically detecting, from indicia derived from online activity using the online user interface device, that the online activity during a select period of time after presentation of the first television advertisement using the set-top box included one or more predefined online activities of interest.

15. The machine of claim 12 wherein the action of part (b) comprises:
   (i) automatically selecting a second advertisement based at least in part on the presumed viewing of the first television advertisement; and
   (ii) automatically causing the second advertisement to be directed to the online user interface device.

16. The machine of claim 12 wherein the computer system is further programmed to automatically select the first television advertisement based at least in part on indicia derived from previous online activity using one or more online user interface devices associated with the set-top box.

17. The machine of claim 16 wherein the computer system is further programmed to automatically cause the first advertisement to be directed to the set-top box.

18. The machine of claim 16 wherein the indicia are derived from previous online activity using at least one online user interface device different from the online user interface device of part (b).

19. The machine of claim 12 wherein the computer system is further programmed to automatically transmit electronic indicia to the television service provider that enables the television service provider to electronically associate a set-top box identifier of the set-top box and an online user interface device identifier of the user interface device, without causing online behavioral profile information pertaining to a user of the online user interface device to be transmitted to the television service provider, and without receiving from the television service provider personally identifiable information pertaining to the user.

20. The machine of claim 19 wherein the television service provider also provides online access to the user via the online user interface device.

21. The machine of claim 12 wherein the computer system is further programmed to associate electronically the set-top box identifier with the online user interface device identifier based on a common IP address, wherein network traffic is routed via the common IP address to both the set-top box and the online user interface device.

22. The machine of claim 12 wherein the computer system is further programmed:
   (i) using the list of television programs within which the entity is responsible for delivering advertisements or allowed to deliver advertisements at a time specified by an additional ad request, automatically to record presumed viewing of one or more additional television advertisements directed to the set-top box; and
   (ii) based on the presumed viewing of each of the additional television advertisements via the set-top box, automatically to cause one or more additional actions to be taken with respect to one or more online user interface devices that are electronically associated with the set-top box;
   (iii) wherein the computer system records the presumed viewing of the one or more additional television advertisements and causes the one or more additional actions to be taken (A) without receiving information, originating from the television service provider or from the set-top box, indicating which television program or television channel is displayed using the set-top box at the time specified by the additional ad request, and (B) without receiving information, originating from the television service provider or from the set-top box, indicating whether the one or more additional television advertisements were displayed using the set-top box.

23. A tangible, non-transitory data storage medium comprising indicia of instructions for a programmed hardware computer system, controlled by an entity independent of a television service provider, to perform a method implemented in connection with television programs or television channels received at a first set-top box from the television service provider, the method comprising:
   (a) using a list of television programs within which the entity is responsible for delivering advertisements or allowed to deliver advertisements at a time specified by an ad request, automatically recording presumed viewing of a first television advertisement directed to the set-top box; and
   (b) based on the presumed viewing of the first television advertisement via the set-top box, automatically causing an action to be taken with respect to an online user interface device that is electronically associated with the set-top box;
   (c) wherein the computer system records the presumed viewing and causes the action to be taken (i) without receiving information, originating from the television service provider or from the set-top box, indicating which television program or television channel is displayed using the set-top box at the time specified by the ad request, and (ii) without receiving information, originating from the television service provider or from the set-top box, indicating whether the first television advertisement was displayed using the set-top box.

24. The medium of claim 23 wherein the indicia of instructions further cause the computer system to automatically transmit an electronic report to a third party concerning the first television advertisement, wherein the report lacks specific indicia of set-top box identifiers and includes indicia of only aggregated data pertaining to the television programs or channels displayed using set-top boxes at the time specified by the ad request.

25. The medium of claim 23 wherein the action of part (b) comprises automatically detecting, from indicia derived from online activity using the online user interface device, that the online activity during a select period of time after presentation of the first television advertisement using the set-top box included one or more predefined online activities of interest.

26. The medium of claim 23 wherein the action of part (b) comprises:
(i) automatically selecting a second advertisement based at least in part on the presumed viewing of the first television advertisement; and
(ii) automatically causing the second advertisement to be directed to the online user interface device.

27. The medium of claim 23 wherein the indicia of instructions further cause the computer system to automatically select the first television advertisement based at least in part on indicia derived from previous online activity using one or more online user interface devices associated with the set-top box.

28. The medium of claim 27 wherein the indicia of instructions further cause the computer system to automatically cause the first advertisement to be directed to the set-top box.

29. The medium of claim 27 wherein the indicia derived from previous online activity are derived from online activity using at least one online user interface device different from the online user interface device of part (b).

30. The medium of claim 23 wherein the indicia of instructions further cause the computer system to automatically transmit electronic indicia to the television service provider that enables the television service provider to electronically associate a set-top box identifier of the set-top box and an online user interface device identifier of the user interface device, without causing online behavioral profile information pertaining to a user of the online user interface device to be transmitted to the television service provider, and without receiving from the television service provider personally identifiable information pertaining to the user.

31. The medium of claim 30 wherein the television service provider also provides online access to the user via the online user interface device.

32. The medium of claim 23 wherein the indicia of instructions further cause the computer system to associate electronically the set-top box identifier with the online user interface device identifier based on a common IP address, wherein network traffic is routed via the common IP address to both the set-top box and the online user interface device.

33. The medium of claim 23 wherein the indicia of instructions further cause the computer system:
(i) using the list of television programs within which the entity is responsible for delivering advertisements or allowed to deliver advertisements at a time specified by an additional ad request, automatically to record presumed viewing of one or more additional television advertisements directed to the set-top box; and
(ii) based on the presumed viewing of each of the additional television advertisements via the set-top box, automatically to cause one or more additional actions to be taken with respect to one or more online user interface devices that is electronically associated with the set-top box;
(iii) wherein the computer system records the presumed viewing and causes the one or more additional actions to be taken (A) without receiving information, originating from the television service provider or from the set-top box, indicating which television program or television channel is displayed using the set-top box at the time specified by the additional ad request, and (B) without receiving information, originating from the television service provider or from the set-top box, indicating whether the first television advertisement was displayed using the set-top box.

* * * * *